United States Patent
Langenfeld

(10) Patent No.: US 10,480,142 B1
(45) Date of Patent: Nov. 19, 2019

(54) DRIVE DEVICE

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 603 days.

(21) Appl. No.: 15/187,193

(22) Filed: Jun. 20, 2016

Related U.S. Application Data

(62) Division of application No. 14/027,749, filed on Sep. 16, 2013, now Pat. No. 9,371,865, which is a division
(Continued)

(51) Int. Cl.
*F04B 1/32* (2006.01)
*F04B 1/20* (2006.01)
(Continued)

(52) U.S. Cl.
CPC ............ *E01H 5/098* (2013.01); *F04B 1/324* (2013.01); *F01B 3/0073* (2013.01); *F01B 3/106* (2013.01);
(Continued)

(58) Field of Classification Search
CPC ..................... E01H 5/098; F15B 11/08; F15B 2211/20546; F15B 2211/20553;
(Continued)

(56) References Cited

U.S. PATENT DOCUMENTS 1,062,524 A   5/1913  Walker
1,338,777 A   5/1920  Johnson
(Continued)

FOREIGN PATENT DOCUMENTS

DE      19538835 C1 *  3/1997  ............ F04B 1/2085
JP      2003003950 A *  1/2003

OTHER PUBLICATIONS

Machine Translation of DE 19538835 C1 to Stoelzer, Mar. 1997, Germany.*
(Continued)

*Primary Examiner* — Thomas E Lazo
*Assistant Examiner* — Michael Quandt
(74) *Attorney, Agent, or Firm* — Neal, Gerber & Eisenberg LLP

(57) ABSTRACT

In a drive device using a hydraulic pump controlled by a rotatable swash plate, the swash plate includes a pocket and a trunnion engaged to the pocket and rotatable about an axis of rotation offset from the swash plate axis of rotation. An interface is formed on a first end of the trunnion, and a first arcuate side of the interface engages a flat portion of the first side of the pocket as the trunnion is rotated in a first direction, and a second arcuate side of the interface engages a flat portion of the second side of the pocket as the trunnion is rotated in the opposite direction. The swash plate may also include at least one protrusion on a top surface extending in a direction perpendicular to swash plate axis of rotation to engage the housing and limit axial movement of the swash plate.

17 Claims, 20 Drawing Sheets

Related U.S. Application Data of application No. 12/533,786, filed on Jul. 31, 2009, now Pat. No. 8,534,060.

(60) Provisional application No. 61/085,662, filed on Aug. 1, 2008.

(51) Int. Cl.
*F01B 3/00* (2006.01)
*F01B 3/10* (2006.01)
*F16H 39/14* (2006.01)
*E01H 5/09* (2006.01)

(52) U.S. Cl.
CPC ... *F04B 1/2085* (2013.01); *F15B 2211/20553* (2013.01); *F16H 39/14* (2013.01)

(58) Field of Classification Search
CPC .......... F04B 1/124; F04B 1/146; F04B 1/148; F04B 1/2078; F04B 1/29; F04B 1/295; F04B 1/306; F04B 1/32; F04B 1/322; F04B 1/324; F04B 27/086; F04B 27/0865; F04B 27/1054; F04B 27/1063; F04B 27/1072; F04B 27/18; F04B 27/22
See application file for complete search history.

(56) References Cited

U.S. PATENT DOCUMENTS

| | | |
|---|---|---|
| 1,386,396 A | 8/1923 | Cornelison |
| 1,636,358 A | 7/1927 | Fairman et al. |
| 1,877,285 A | 9/1932 | Eckels |
| 2,692,516 A | 10/1945 | O'Leary |
| 2,578,584 A | 12/1951 | Osborn |
| 2,594,688 A | 4/1952 | Shapiro |
| 3,257,959 A * | 6/1966 | Budzich ................ F04B 1/324 417/217 |
| 3,360,933 A | 1/1968 | Swanson et al. |
| 3,362,161 A | 1/1968 | Flint |
| 3,424,032 A | 1/1969 | Ritter |
| 3,435,928 A | 4/1969 | Horning |
| 3,458,114 A | 7/1969 | Catterson |
| 3,486,335 A * | 12/1969 | Sweigert ................ F16H 39/14 60/488 |
| 3,727,712 A | 4/1973 | Colloton |
| 3,817,403 A | 6/1974 | Glachet et al. |
| 3,935,796 A | 2/1976 | Wood |
| 4,116,279 A | 9/1978 | Kilburn |
| 4,186,317 A | 1/1980 | Sisk |
| 4,245,920 A | 1/1981 | Barrett |
| 4,329,064 A | 5/1982 | Mann et al. |
| 4,377,203 A | 3/1983 | Ejima |
| 4,526,140 A * | 7/1985 | Monigold ............... F02D 17/04 123/196 S |
| 4,589,249 A | 5/1986 | Walker et al. |
| 4,658,662 A | 4/1987 | Rundle |
| 4,707,971 A | 11/1987 | Forpahl et al. |
| 4,724,747 A | 2/1988 | Stum et al. |
| 5,019,735 A | 5/1991 | Lee |
| 5,099,936 A | 3/1992 | Irikura et al. |
| 5,121,788 A | 6/1992 | Carollo |
| 5,146,748 A * | 9/1992 | Okada ................ B60K 17/105 180/305 |
| 5,201,692 A | 4/1993 | Johnson et al. |
| 5,314,387 A | 5/1994 | Hauser et al. |
| 5,327,036 A | 7/1994 | Carey |
| 5,343,101 A | 8/1994 | Matanl |
| 5,392,670 A | 2/1995 | Hauser |
| 5,498,130 A | 3/1996 | Wakely et al. |
| 5,520,272 A | 5/1996 | Ewer |
| 5,540,119 A | 7/1996 | Hudson |
| 5,544,547 A | 8/1996 | Ishimaru |
| 5,584,675 A | 12/1996 | Steurer et al. |
| 5,628,620 A * | 5/1997 | Arlton ................ A63H 27/12 416/103 |
| 5,697,264 A | 12/1997 | Andrews et al. |
| 5,819,537 A | 10/1998 | Okada et al. |
| 5,894,783 A | 4/1999 | Hauser et al. |
| 5,927,176 A * | 7/1999 | Stolzer ................. F04B 1/2085 91/505 |
| 5,947,218 A | 9/1999 | Ishimaru |
| 6,056,521 A | 5/2000 | Leu et al. |
| 6,098,385 A | 8/2000 | Turk |
| 6,146,113 A | 11/2000 | Fassnacht et al. |
| 6,266,598 B1 | 7/2001 | Pilar et al. |
| 6,302,617 B1 | 10/2001 | Rumpp |
| 6,331,101 B2 | 12/2001 | Leu et al. |
| 6,332,393 B1 | 12/2001 | Trimble |
| 6,435,889 B1 | 8/2002 | Vinson et al. |
| 6,457,546 B1 | 10/2002 | Ishimaru et al. |
| 6,536,212 B1 * | 3/2003 | Irikura ................... F04B 1/324 60/469 |
| 6,575,868 B1 | 6/2003 | Keusch et al. |
| 6,579,072 B2 | 6/2003 | Trousil et al. |
| 6,589,029 B1 | 7/2003 | Heller |
| 6,643,959 B2 | 11/2003 | Joliff et al. |
| 6,651,529 B1 | 11/2003 | Poplawsli et al. |
| 6,692,240 B1 | 2/2004 | Leonhard et al. |
| 6,701,825 B1 * | 3/2004 | Langenfeld ............ F04B 1/324 60/487 |
| 6,845,837 B2 | 1/2005 | Ohashi et al. |
| 6,875,147 B2 | 4/2005 | Thoma et al. |
| 6,986,406 B1 | 1/2006 | Hauser et al. |
| 7,059,991 B2 | 6/2006 | Puiu |
| 7,073,330 B1 | 7/2006 | Hauser |
| 7,077,778 B1 | 7/2006 | Irikura |
| 7,089,824 B2 | 8/2006 | Nakatani et al. |
| 7,137,250 B1 | 11/2006 | McCoy et al. |
| 7,222,485 B2 | 5/2007 | Shibata et al. |
| 7,225,704 B2 | 6/2007 | Ishii et al. |
| 7,338,403 B2 | 3/2008 | Puiu |
| 7,357,750 B2 | 4/2008 | Okada |
| 7,367,353 B1 | 5/2008 | Langenfeld et al. |
| 7,373,871 B1 | 5/2008 | Buescher |
| 7,455,130 B2 | 11/2008 | Irikura |
| 7,487,608 B2 | 2/2009 | Yamazaki et al. |
| 7,493,711 B2 | 2/2009 | Gautreau et al. |
| 7,503,172 B2 | 3/2009 | Sakakura et al. |
| 7,540,102 B2 | 6/2009 | Olmr et al. |
| 7,577,507 B2 | 8/2009 | Morris |
| 7,788,919 B2 | 9/2010 | Ohashi et al. |
| 7,841,176 B1 | 11/2010 | Langenfeld et al. |
| 7,913,799 B2 | 3/2011 | Kawashiri et al. |
| 7,926,624 B1 | 4/2011 | Taylor |
| 7,927,245 B1 | 4/2011 | Langenfeld et al. |
| 7,988,582 B1 | 8/2011 | Hauser |
| 8,046,992 B2 | 11/2011 | Abend et al. |
| 8,161,834 B2 | 4/2012 | Steffens |
| 8,251,868 B2 | 8/2012 | Ichikawa et al. |
| 8,313,405 B2 | 11/2012 | Bazyn et al. |
| 8,313,407 B2 | 11/2012 | Ekonen et al. |
| 8,313,408 B1 | 11/2012 | Langenfeld |
| 8,393,236 B1 | 3/2013 | Hauser et al. |
| 8,443,598 B1 | 5/2013 | Hauser et al. |
| 8,464,610 B1 | 6/2013 | Langenfeld et al. |
| 8,479,418 B1 | 7/2013 | Langenfeld |
| 8,534,060 B1 | 9/2013 | Bennett et al. |
| 8,636,616 B1 | 1/2014 | Langenfeld |
| 8,739,905 B1 | 6/2014 | Bennett |
| 9,109,684 B1 | 8/2015 | Langenfeld et al. |
| 2001/0047655 A1 | 12/2001 | Hauser et al. |
| 2003/0033803 A1 | 2/2003 | Ohashi et al. |
| 2007/0209456 A1 | 9/2007 | Irikura et al. |
| 2008/0018267 A1 | 1/2008 | Arakawa et al. |
| 2008/0018269 A1 | 1/2008 | Wyatt et al. |
| 2008/0041048 A1 | 2/2008 | Kanenobu et al. |
| 2010/0147097 A1 | 6/2010 | Kim et al. |
| 2012/0297757 A1 | 11/2012 | Kamikawa |

(56) References Cited

OTHER PUBLICATIONS

JP 2003003950 machine translation to English from espacenet. (Year: 2003).*

* cited by examiner

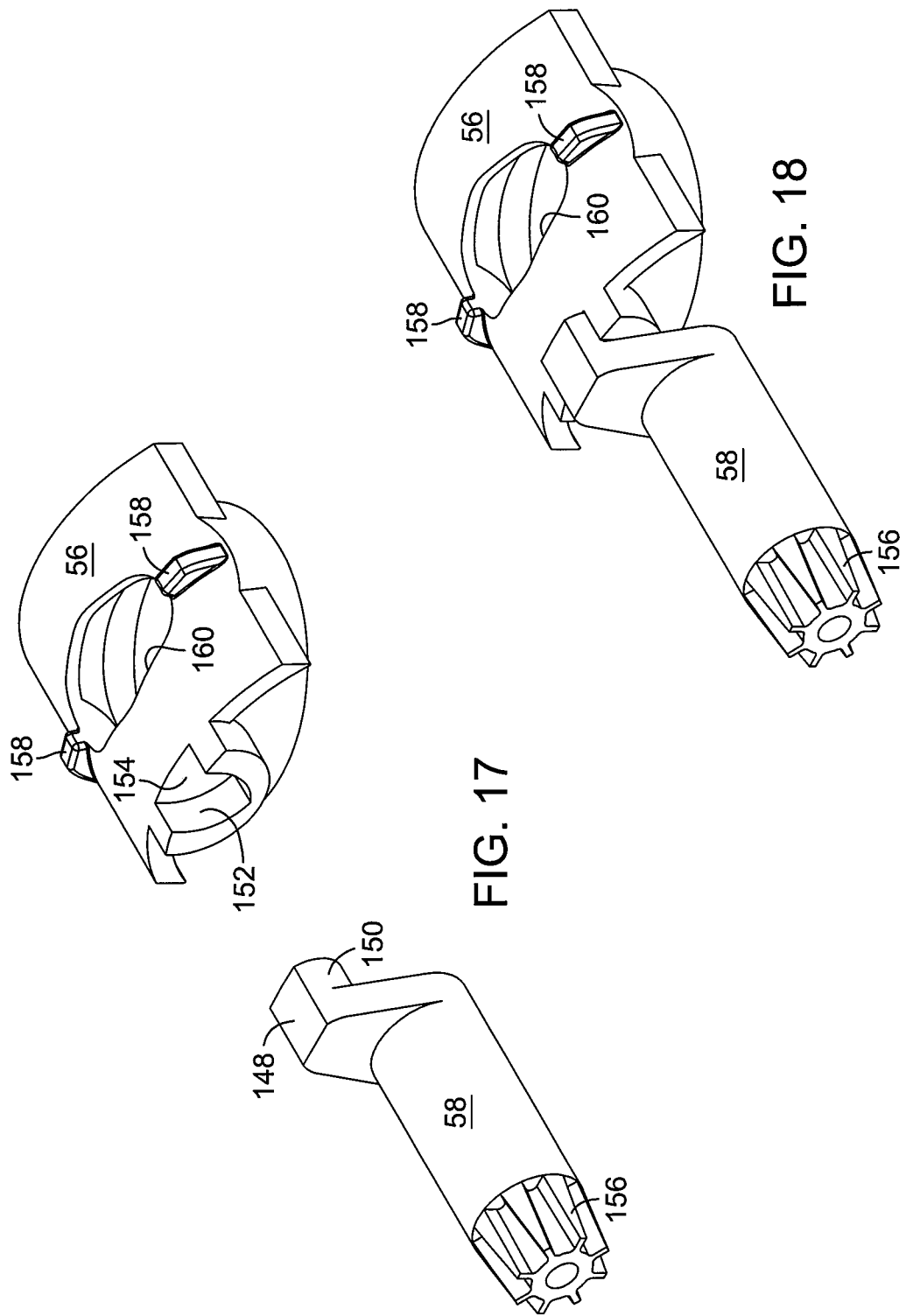

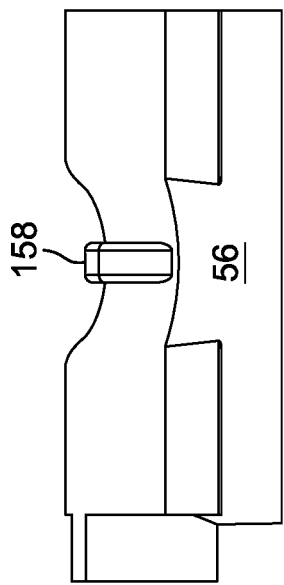
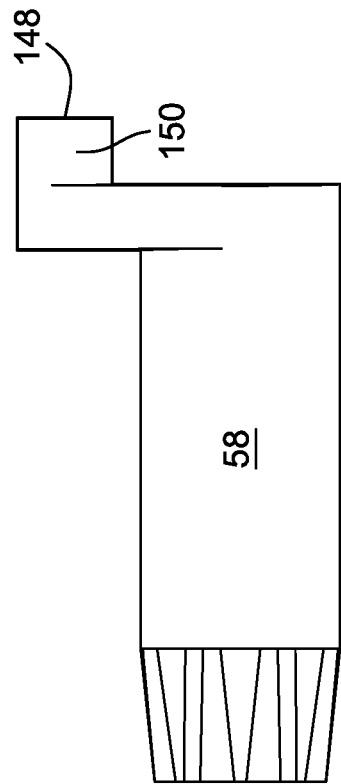
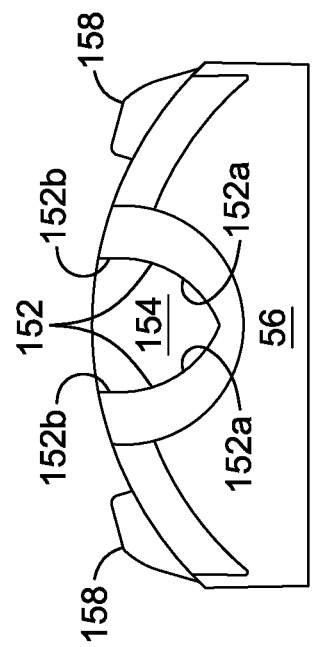
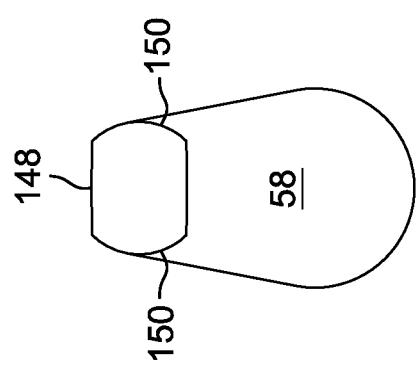

DRIVE DEVICE

CROSS REFERENCE

This application is a divisional of U.S. patent application Ser. No. 14/027,749, filed on Sep. 16, 2013, which is a divisional of U.S. patent application Ser. No. 12/533,786, filed on Jul. 31, 2009, now U.S. Pat. No. 8,534,060, which claims the benefit of U.S. Provisional Patent Application No. 61/085,662, filed on Aug. 1, 2008. These prior applications are incorporated herein by reference in their entirety.

BACKGROUND OF THE INVENTION

This application is related to drive devices for walk-behind vehicles. Drive devices are known. Though some of these devices have been specifically designed for walk-behind applications, opportunities exist for improvements in steering clutches, swash plates, and housings.

SUMMARY OF THE INVENTION

An improved housing for a drive device and an improved clutch arrangement are disclosed herein. An improvement relating to a swash plate configuration is also presented. An improved vent configuration for a hydraulic drive device where one side of the vent may be used during shipping and the other side of the vent is used during operation is also disclosed herein. It should be understood that while the improvements to the swash plate and vent may be directed to a hydraulic drive device, other aspects of the present invention may be applied by one of skill in the art to any drive apparatus having a motive output to be distributed to a drive axle, such as, without limitation, a hydraulic, toroidal, gear or friction drive apparatus.

A better understanding of the objects, advantages, features, properties and relationships of the invention will be obtained from the following detailed description and accompanying drawings which set forth illustrative embodiments and are indicative of the various ways in which the principles of the invention may be employed.

BRIEF DESCRIPTION OF THE DRAWINGS

FIG. 17 is an exploded perspective view of an embodiment of a swash plate mechanism and mating trunnion in accordance with the principles of the present invention.

FIG. 18 is a perspective view of the swash plate mechanism shown in FIG. 17.

FIG. 19 is a side elevational view of the mating trunnion shown in FIG. 17.

FIG. 20 is a side elevational view of the swash plate shown in FIG. 17.

FIG. 21 is an end elevational view of the mating trunnion shown in FIG. 17.

FIG. 22 is an end elevational view of the swash plate shown in FIG. 17.

DETAILED DESCRIPTION OF THE DRAWINGS

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
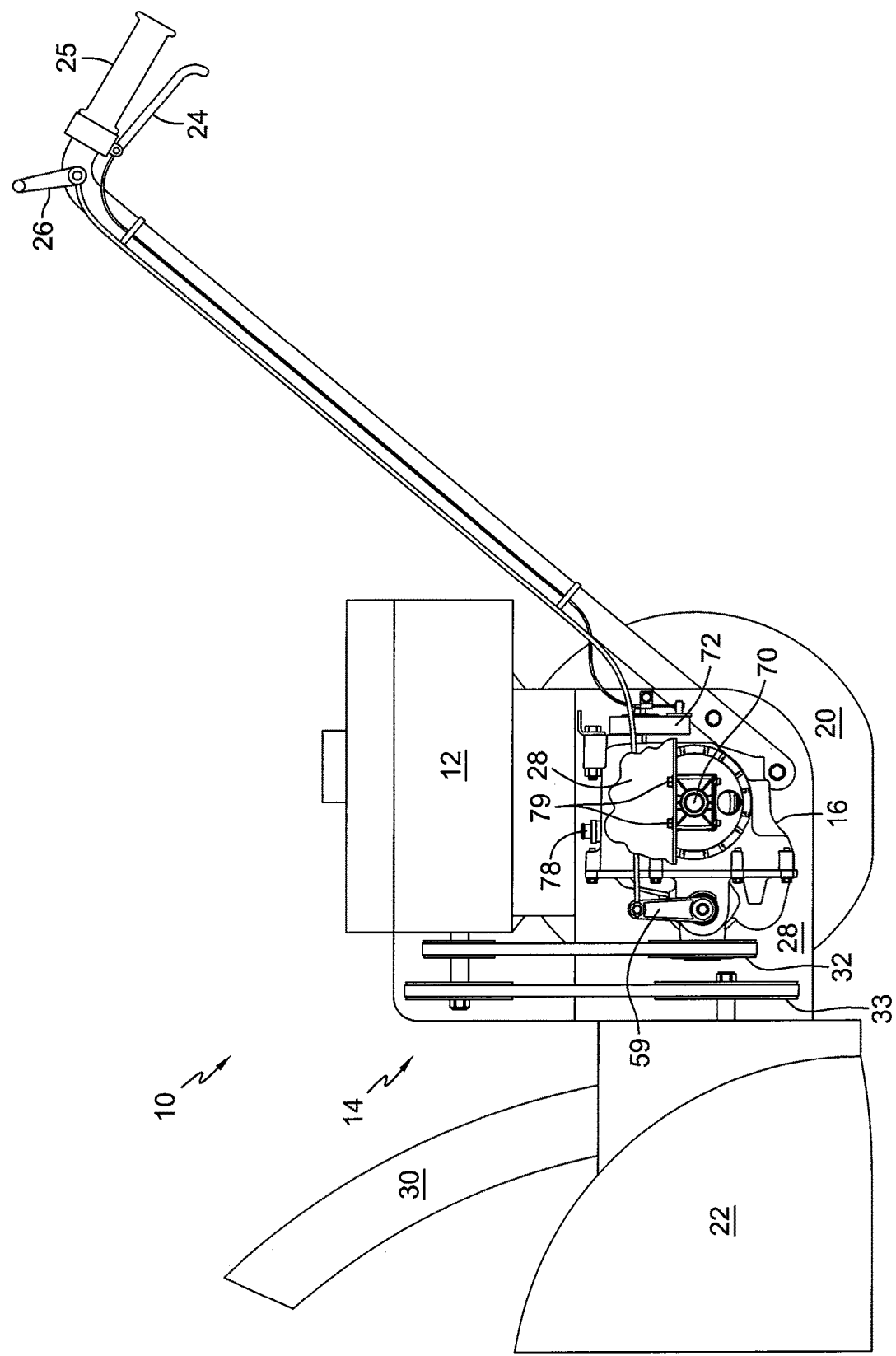
FIG. 1 is an elevational view of a snow thrower incorporating an embodiment of a drive device in accordance with the principles of the present invention.
Figure 2:
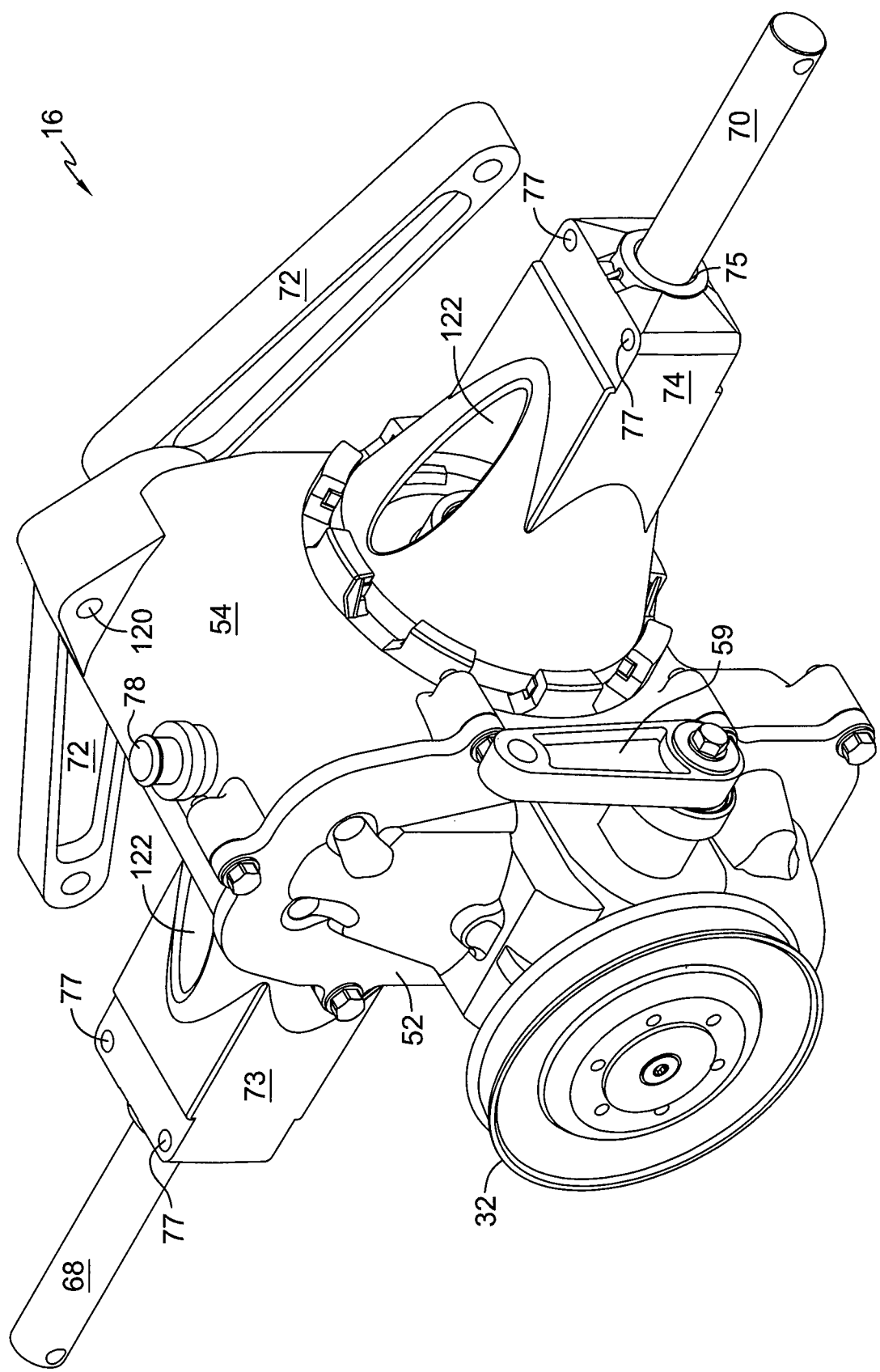
FIG. 2 is a perspective view of an embodiment of a drive device in accordance with the principles of the present invention.
Figure 3:
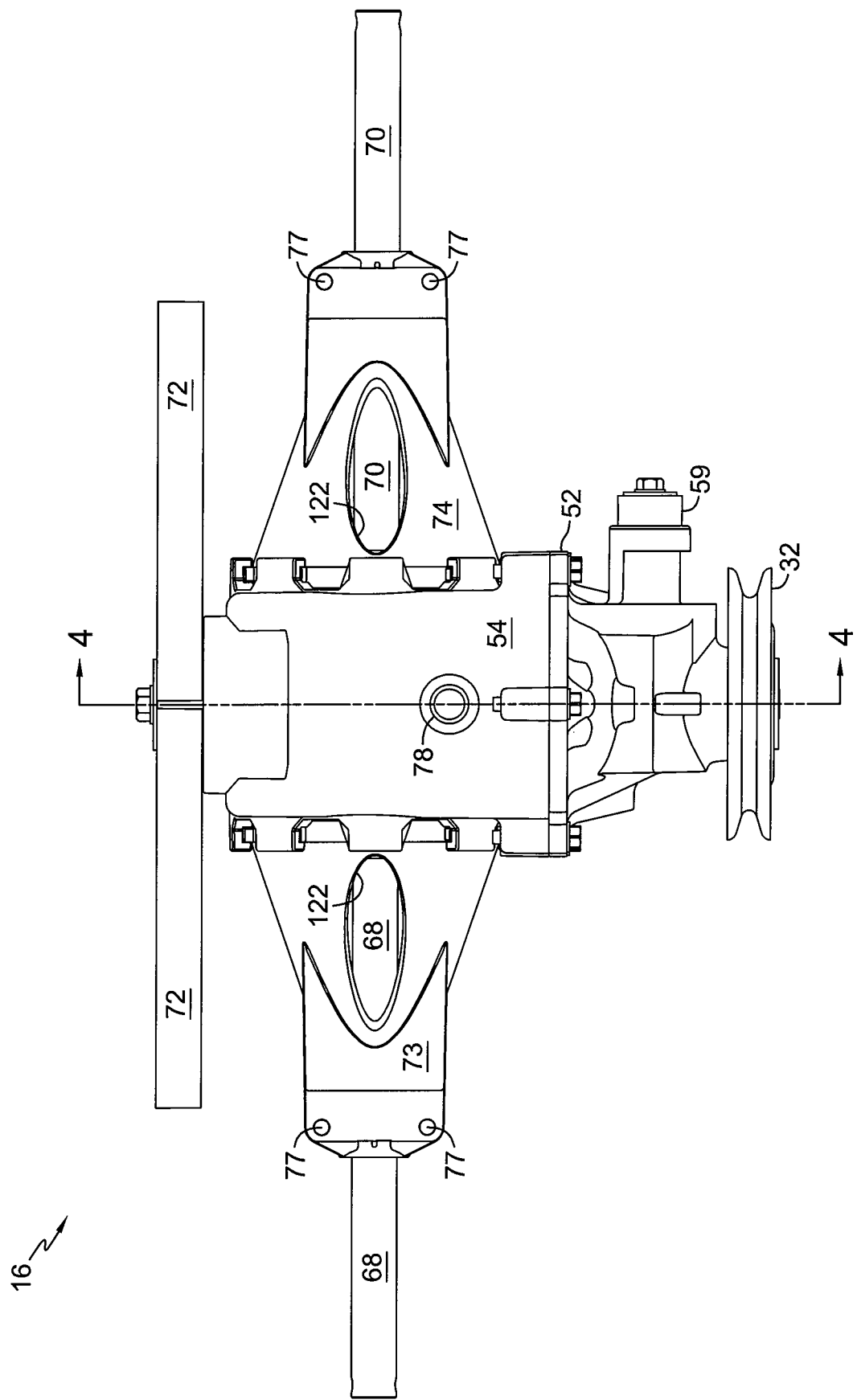
FIG. 3 is a plan view of the embodiment of a drive device of FIG. 2.
Figure 4:
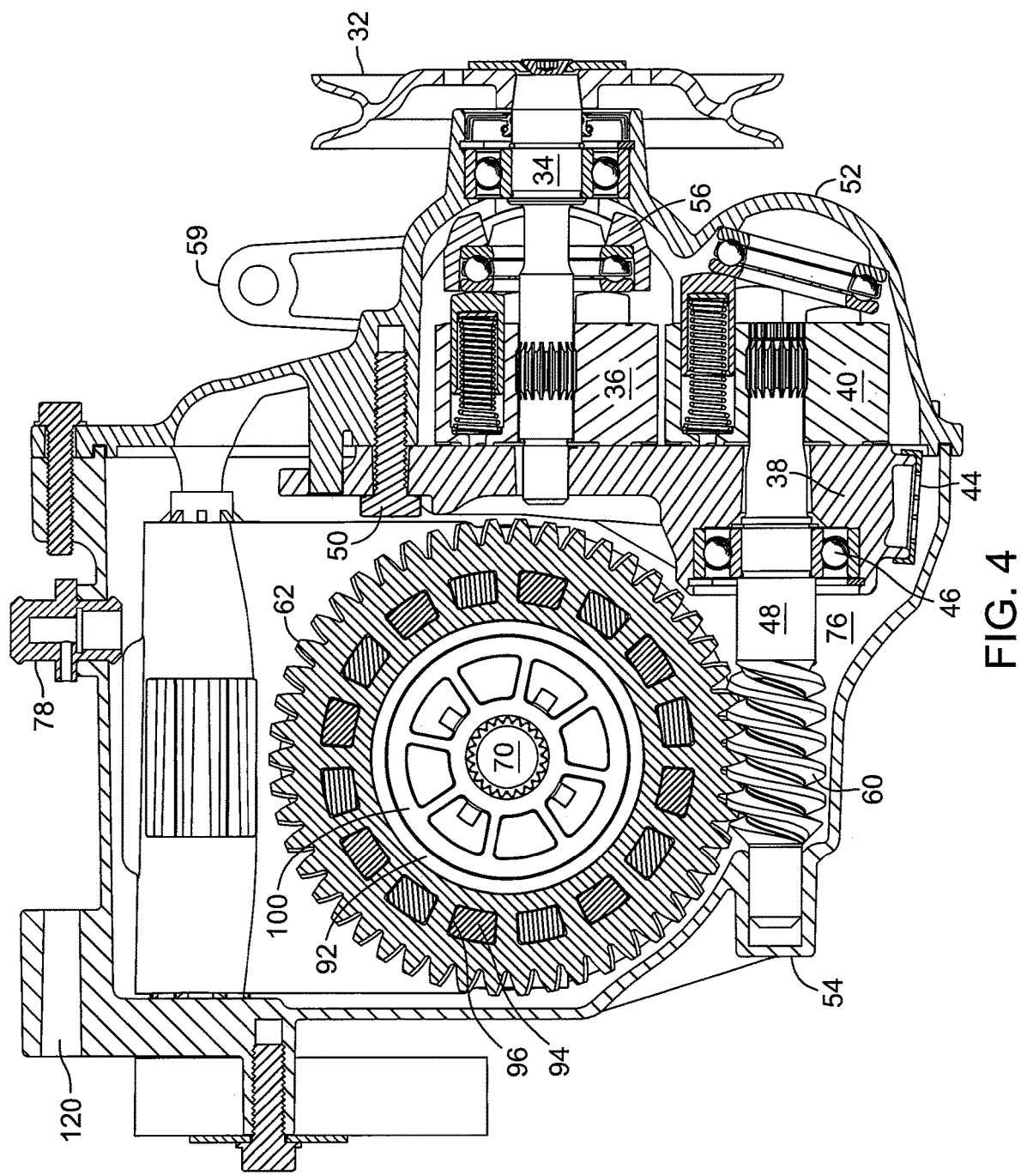
FIG. 4 is a sectional view along the lines 4-4 of FIG. 3.
Figure 5:
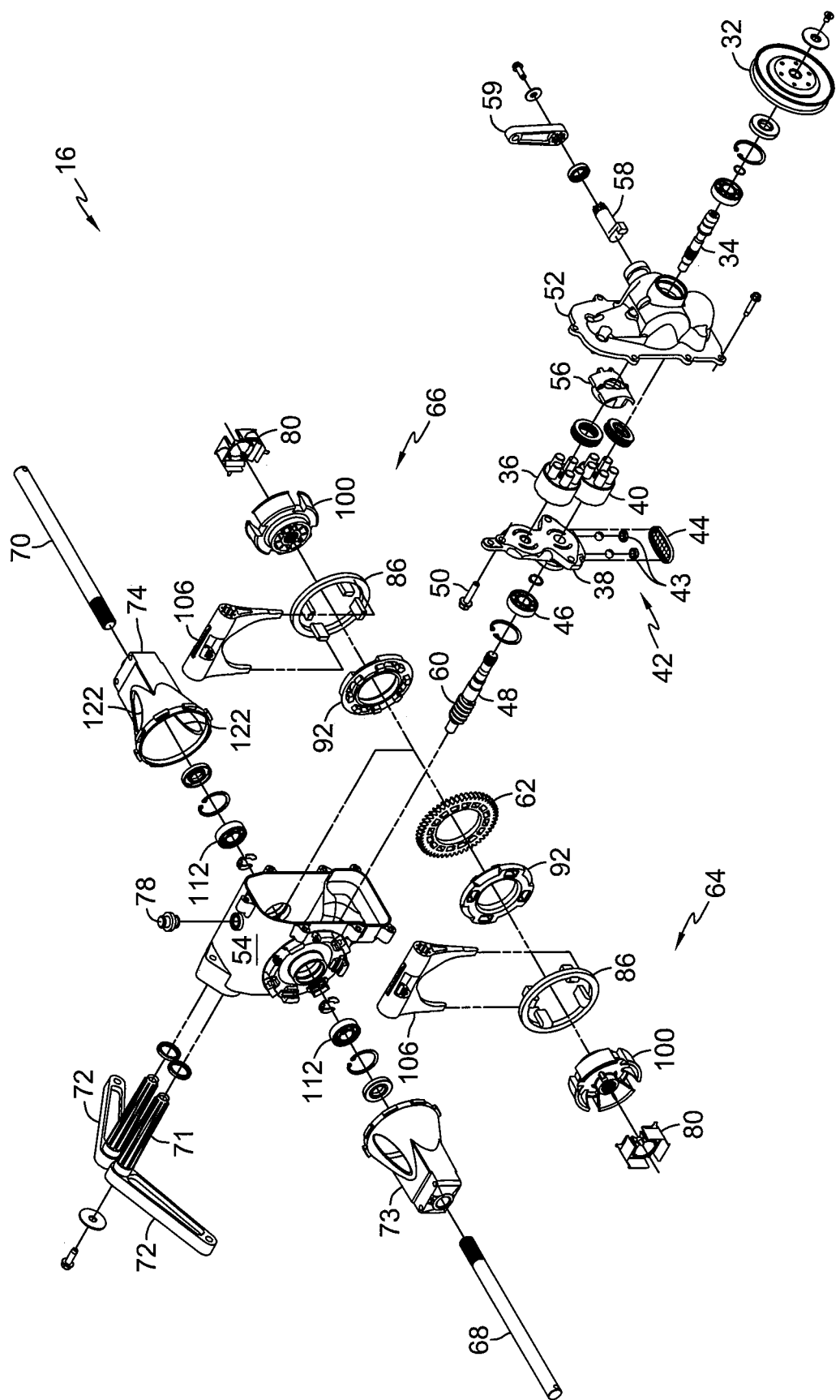
FIG. 5 is an exploded perspective view of the drive device of FIG. 2.

The various embodiments disclosed herein may be used in a vehicle 10 similar to that shown in FIG. 1, which is shown here as a snow thrower. Such vehicles are powered by a prime mover 12, which may be an internal combustion engine, electrically powered motor or the like. Prime mover 12 may be connected to various powered systems on vehicle 10 by a pulley and belt system 14. One driven pulley 32 may power a drive device 16, which contains one or more output shafts, such as axle shafts 68 and 70 as shown in FIG. 2. Axle shafts 68 and 70 may then each drive a wheel 20. Another driven pulley 33 may power a device such as a snow thrower or blower 22. The aforementioned elements may be supported directly or indirectly on a frame 28.

Vehicle 10 may also have various controls located to be operable by an operator. Such controls may include a pair of levers 24 to engage clutch assemblies 64 and 66 located in drive device 16. Another control that may be provided is a throttle or speed control lever 26. Additional controls may be provided to control engagement of the power take off, which is shown as a snow thrower or blower 22, the direction of chute 30, engine choke (not shown) and other features related to the operation of vehicle 10.

The construction of drive device 16 may be seen in more detail in FIGS. 2-5. As previously noted, drive device 16 may be powered by prime mover 12 by way of a belt and pulley system 14, which drives pulley 32 that further drives input shaft 34. Input shaft 34 is engaged to and drives hydraulic pump 36. Center section 38 contains internal porting (not shown) that hydraulically connects hydraulic pump 36 to hydraulic motor 40, which is rotatably supported by center section 38, and both pump 36 and motor 40 are rotatably disposed thereon.

Center section 38 may have a plurality of other components installed therein or thereon to aid in the operation of drive device 16, such as valves 42. In the depicted embodiment, valves 42 are check ball valves, but it will be appreciated by those in the art that valves 42 may be check valves, combination valves that include check, neutral, pressure rise rate, or relief functions, bypass valves or other types of valves. Valves 42 may each comprise a seat or body 43 that is pressed into a port in center section 38 that communicates with the internal porting of center section 38. Depending on the operating conditions of drive device 16, additional retention of body 43 may be required. Thus, center section 38 may be configured to permit staking of body 43 in place, or a retaining ring (not shown) or other element may be located adjacent body 43 to keep the pressure conditions of the internal porting of center section 38 from pushing body 43 out of center section 38.

Other elements located on or in center section 38 may include a filter 44, one or more bearings such as bearing 46 that supports motor output shaft 48, fastener 50, or multiple fasteners 50, that extend parallel to shaft 34 and shaft 48 to support center section 38 in a sump 76 formed by first housing 52 and second housing 54. Note that such fastened center section configurations are known in the art. For example, U.S. Pat. No. 5,392,670 to Hauser, incorporated herein by reference in its entirety, shows a center section 62 installed within a housing element. Unnumbered fasteners holding center section 62 to a housing element are readily seen in FIGS. 1, 3 and 5 of the '670 patent.

Drive device 16 is shown as a continuously variable hydraulic or hydrostatic transmission of a type known as an integrated hydrostatic transmission. This type of transmission may use a swash plate 56 to control the displacement of pump 36. Thus, as swash plate 56 is moved by a trunnion arm 58, the displacement of the pistons in pump 36 changes, causing fluid to flow through the internal porting of center section 38 to motor 40, causing motor 40 to rotate. Trunnion arm 58 may be moved manually by a control arm 59 or by an electronic or hydraulic control, as is known in the art. Examples of such electronic controls may be found in U.S. Pat. No. 7,073,330 and Pub. No. 2008/0018267, both of which are incorporated herein in their entireties.

Motor 40 then drives output shaft 48. Output shaft 48 may have a gear 60 formed thereon or mounted thereon. Gear 60 is shown as a worm gear, but output shaft 48 is adaptable to other gearing configurations, as would be known to a person of ordinary skill in the art. As output shaft 48 rotates, gear 60 drives mating gear 62. Located on opposing sides of gear 60 are first clutch assembly 64, associated with axle shaft 68, and second clutch assembly 66, associated with axle shaft 70.

In the depicted embodiment, a plurality of arms 72 are engaged to the clutch assemblies. Each clutch assembly may be actuated individually by a separate arm 72 to permit individual actuation of axle shaft 68 and axle shaft 70, allowing drive device 16 to steer vehicle 10 as well as propel vehicle 10.

Each axle shaft 68 and 70 may require bearing support some distance from housing 54. Axle support housings 73 and 74 may provide locations for bearing support some distance from second housing 54, such as bearing support 75 shown in FIG. 2. Axle support housings 73 and 74 may also provide locations to attach drive device 16 to vehicle 10. For example, openings 77 may provide locations for fasteners 79 to attach drive device 16 to vehicle 10. Depending upon the material selected for axle support housings 73 and 74 and the anticipated loading of axles 68 and 70, bearing support 75 may be configured as a journal bearing or molded to receive a bushing or bearing.

Figure 6:
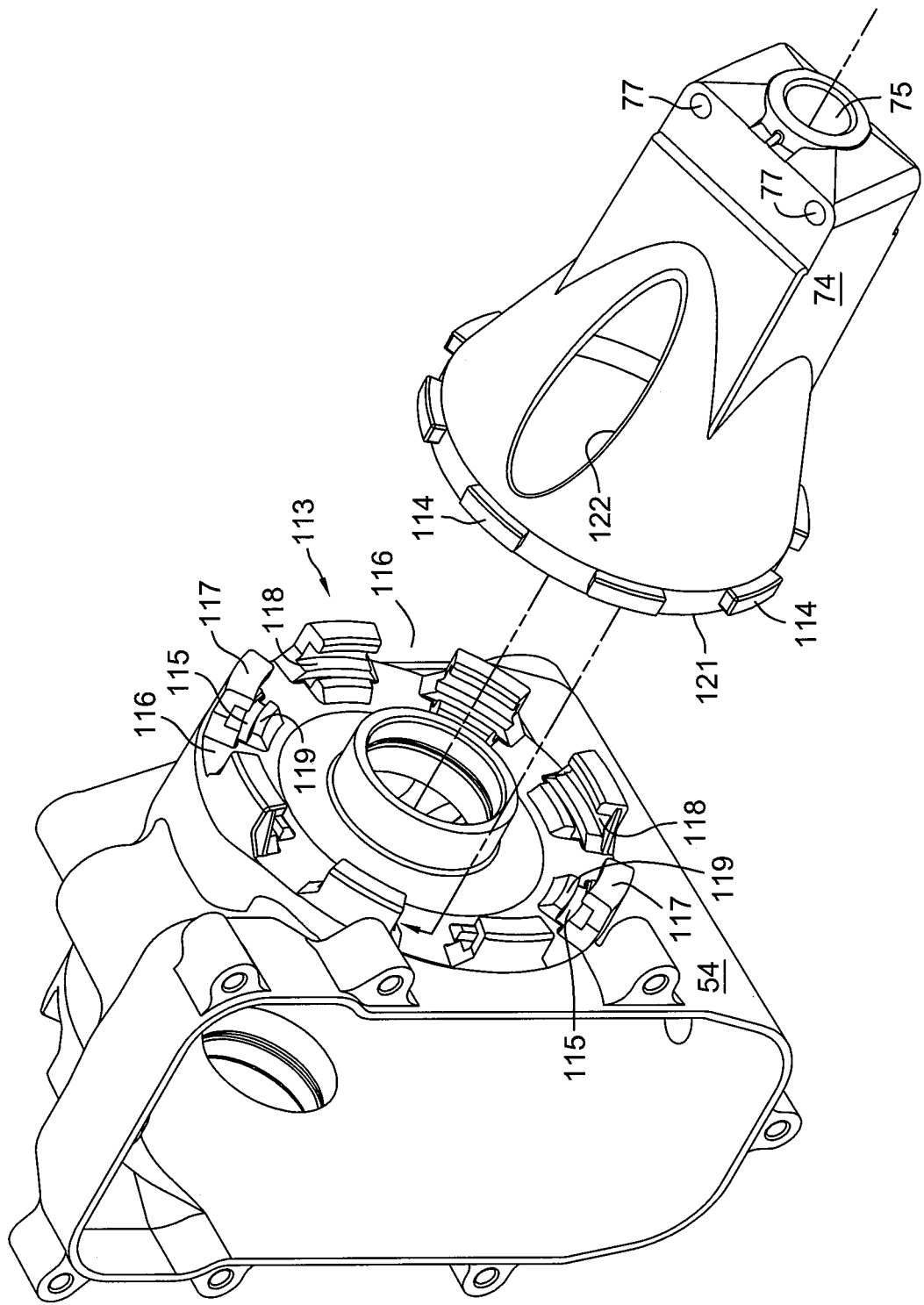
FIG. 6 is an exploded perspective view of a portion of a housing assembly of the drive device of FIG. 2.

Fasteners 79 and openings 77 may also serve to maintain the orientation between axle support housing 74 and second housing 54. As best seen in FIG. 6, axle support housing 74 has a plurality of projections 114 formed thereon, which engage the engagement structure 113 formed on second housing 54. As discussed in detail below, the depicted embodiment of engagement structure 113 comprises a plurality of projections 117, each projection 117 having a slot 118 and being separated from the succeeding projection 117 by a gap 116. During assembly, the plurality of projections 114 are positioned in gaps 116 on second housing 54, and axle support housing 74 is rotated so that projections 114 engage slots 118, thus securing axle support housing 74 to second housing 54. However, axle support housing 74 may still rotate such that projections 114 become disengaged from slots 118. When drive device 16 is attached to vehicle frame 28 by fasteners 79, and a fastener is located in opening 120, as seen, e.g., in FIG. 4, the rotation of axle support housing 74 with respect to second housing 54 is limited. Thus, the fasteners that attach drive device 16 to vehicle frame 28 also act to keep axle support housing 74 attached to drive device 16. This arrangement does permit, however, limited movement of axle support housing 74 relative to second housing 54 as vehicle frame 28 flexes in order to reduce the stress in axle support housing 74 under some load conditions of vehicle frame 28.

Because axle support housings 73 and 74 are essentially hollow, additional support for axle support housings 73 and 74 may be desirable. As these two axle support housings 73 and 74 are essentially identical, only one will be described. As seen in, e.g., FIG. 6, housing 54 and axle support housing 74 have a plurality of support structures.

Each support structure includes lip 119, formed adjacent projection 117 to form groove 115. Edge 121 of axle support housing 74 may then rest in groove 115 when axle support housing 74 is attached to second housing 54 to maintain the shape and position of axle support housing 74. As shown in FIG. 6, second housing 54 has a plurality of projections 117 and a plurality of lips 119. The support for axle support housing 74 may allow axle support housing 74 to be formed of aluminum or a plastic. The plastic may be an approximately 30% glass filled nylon 6/6, and in the depicted embodiment, the plastic is a 33% glass filled nylon 6/6. It will be appreciated by those in the art that under certain conditions, an aluminum axle support housing 74 may be cast as a single element with second housing 54.

Axle support housing 74 may have additional features. For example, openings 122 serve to reduce the amount of material or debris that may build up within axle support housing 74, since axle support housing 74 is mated to second housing 54 without sealing. Thus, debris that might enter axle support housing 74 may either fall through an opening 122 located on the bottom of axle support housing 74, or water or other cleaning fluid may be introduced into one of the openings 122 to clean the interior of axle support housing 74.

Figure 7:
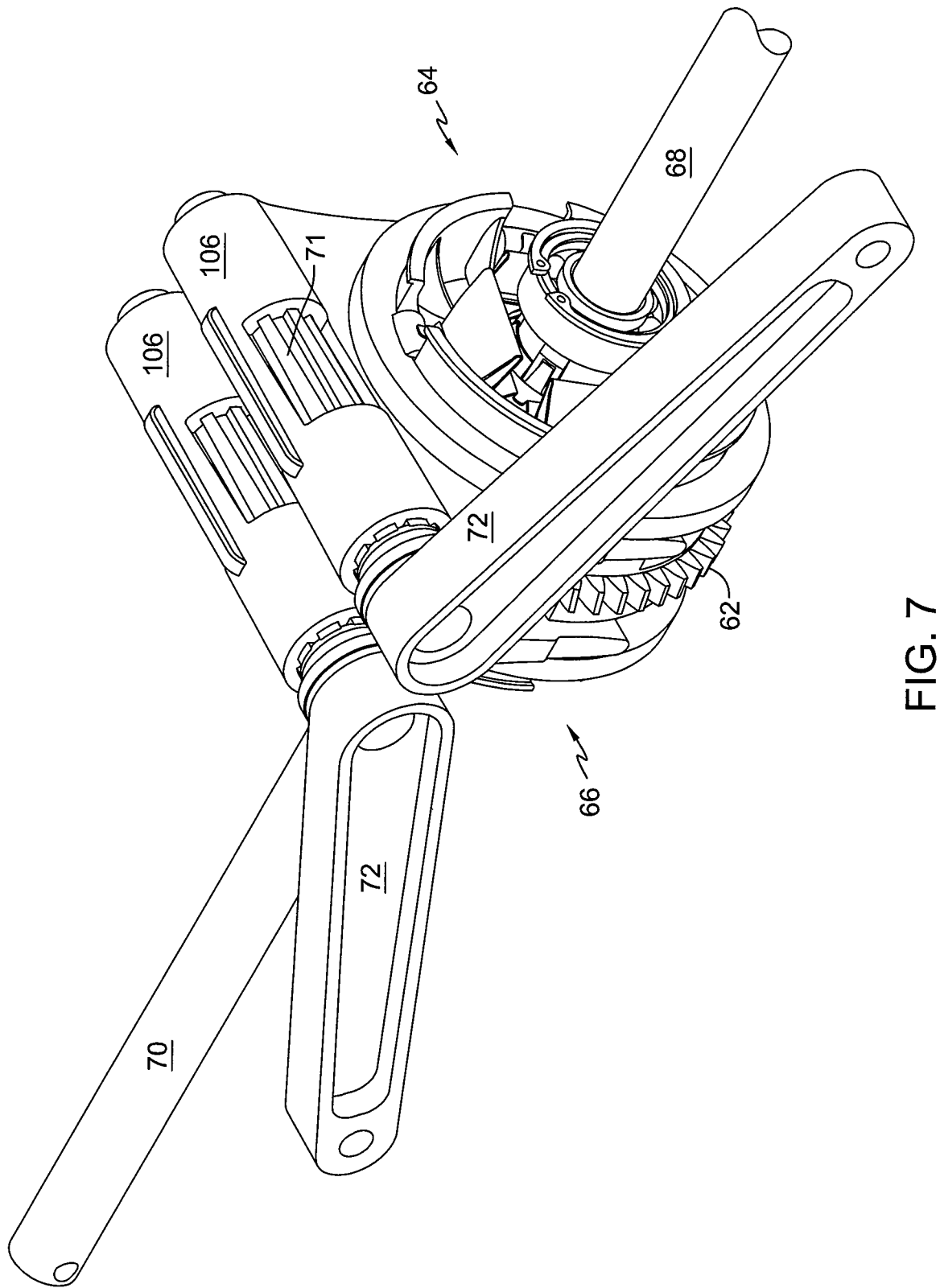
FIG. 7 is a perspective view of the clutch assembly and the control arms for the clutch assembly shown in FIG. 5 with both clutches in the engaged position.
Figure 8:
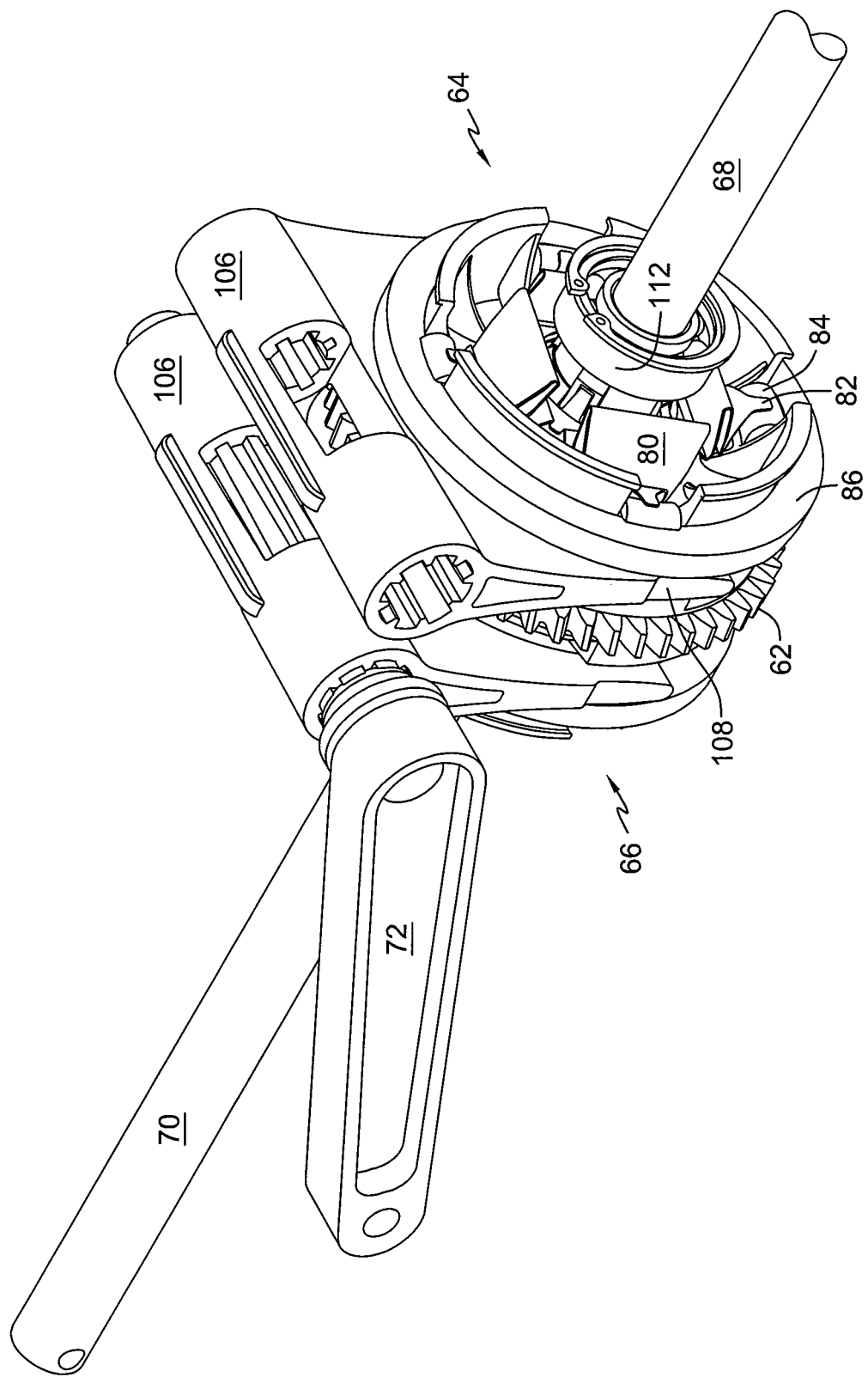
FIG. 8 is a perspective view of the clutch assembly shown in FIG. 7 with one control arm removed.
Figure 9:
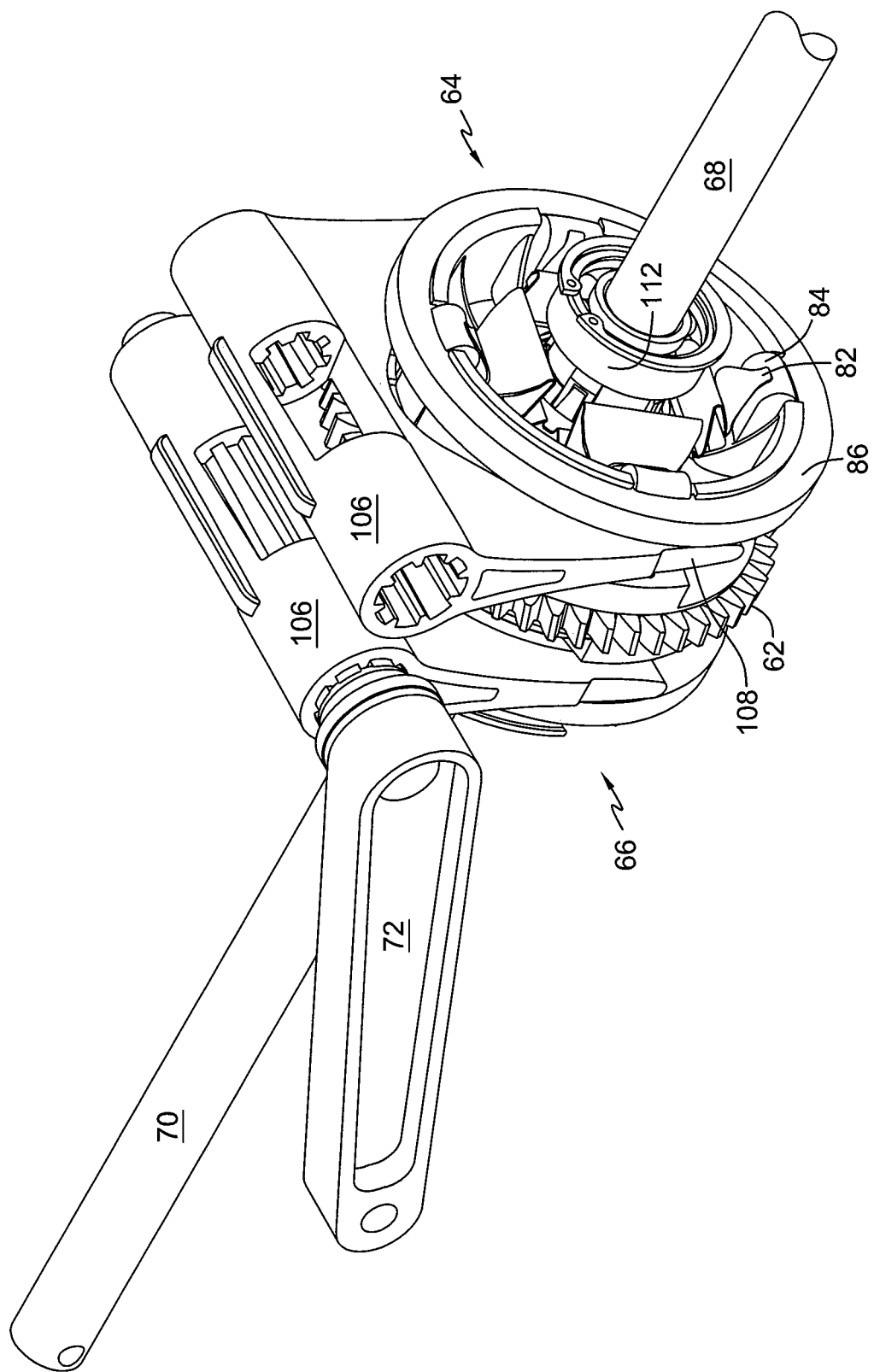
FIG. 9 is a perspective view of the clutch assembly shown in FIG. 7 with one control arm removed and with one clutch in an engaged position and one clutch in a disengaged position.
Figure 10:
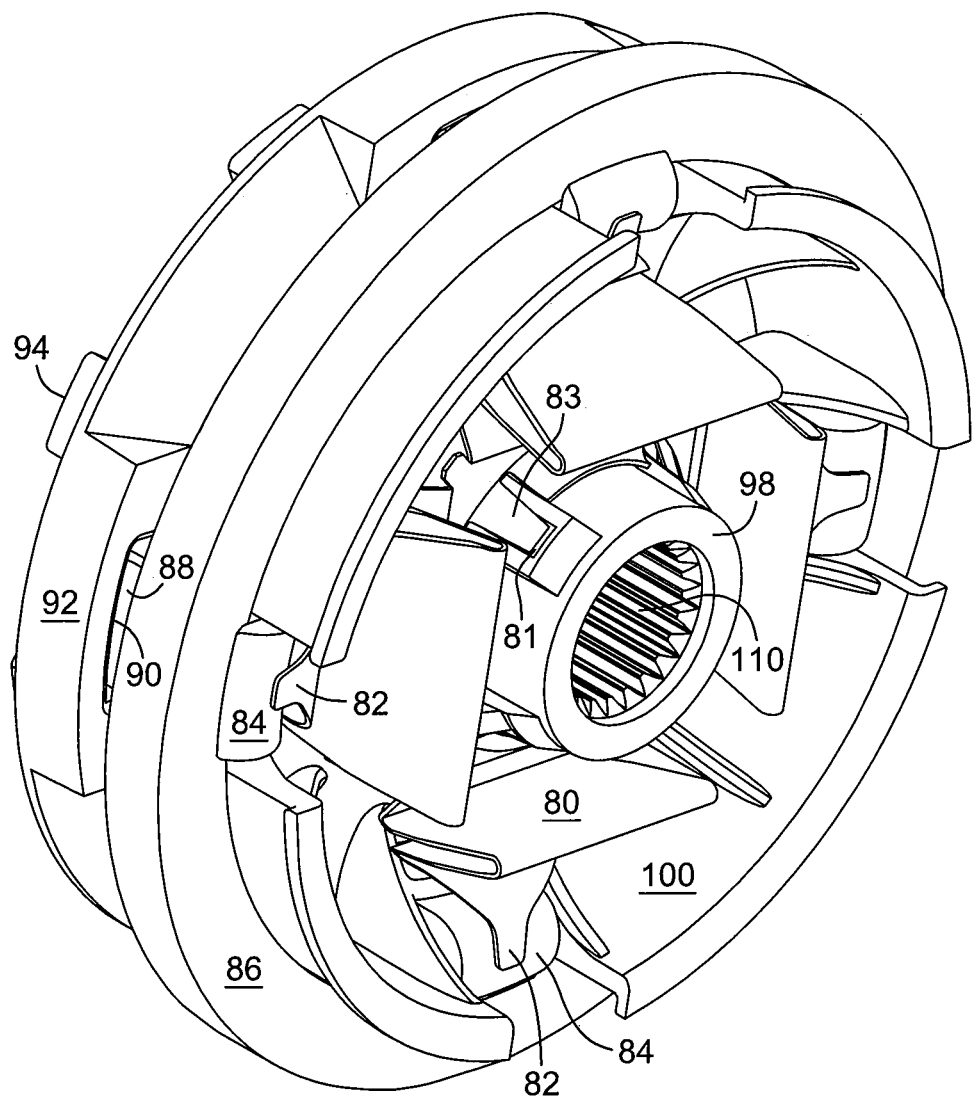
FIG. 10 is a perspective view of a portion of the clutch assembly shown in FIG. 7 in the engaged position.
Figure 11:
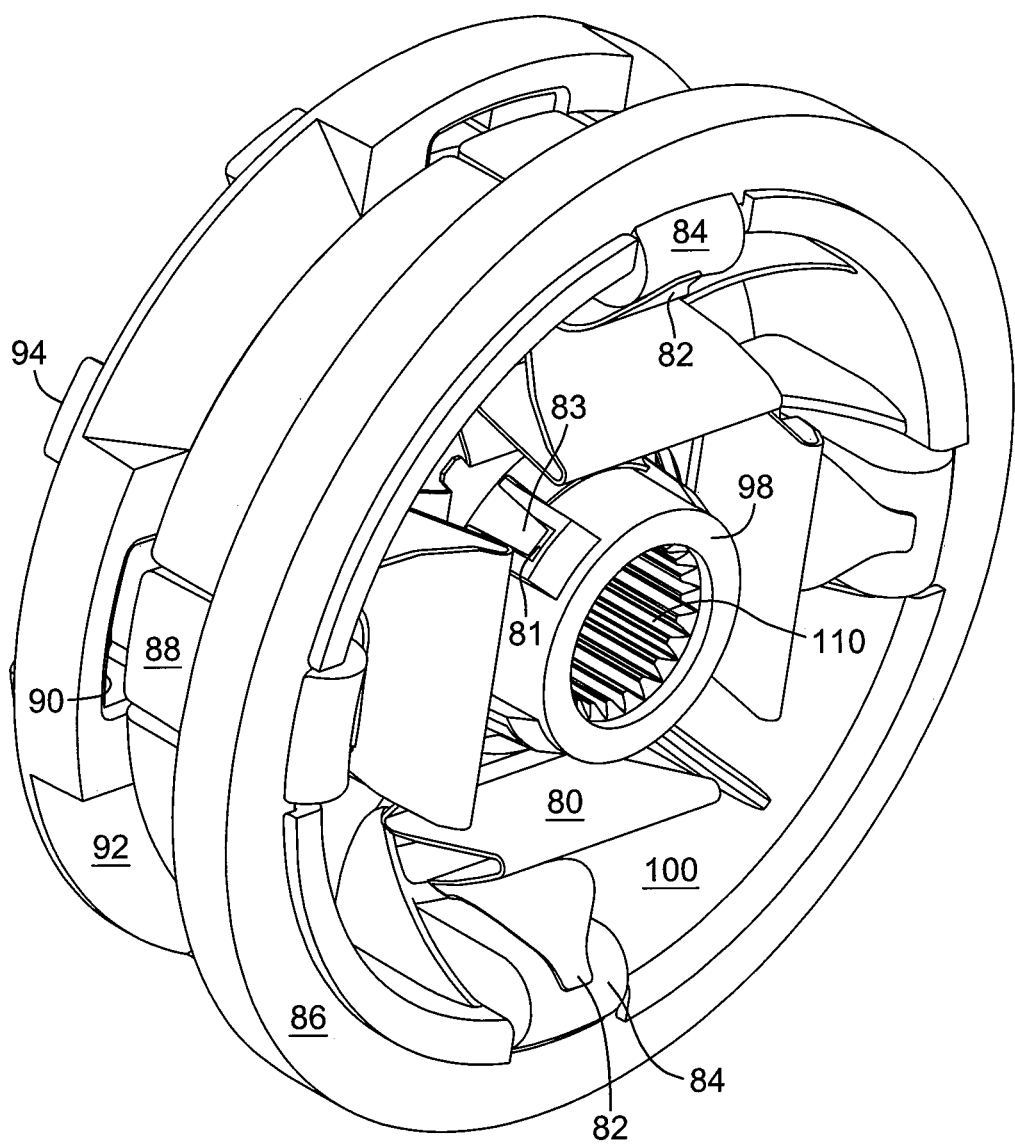
FIG. 11 is a perspective view of a portion of the clutch assembly shown in FIG. 7 in the disengaged position.
Figure 12:
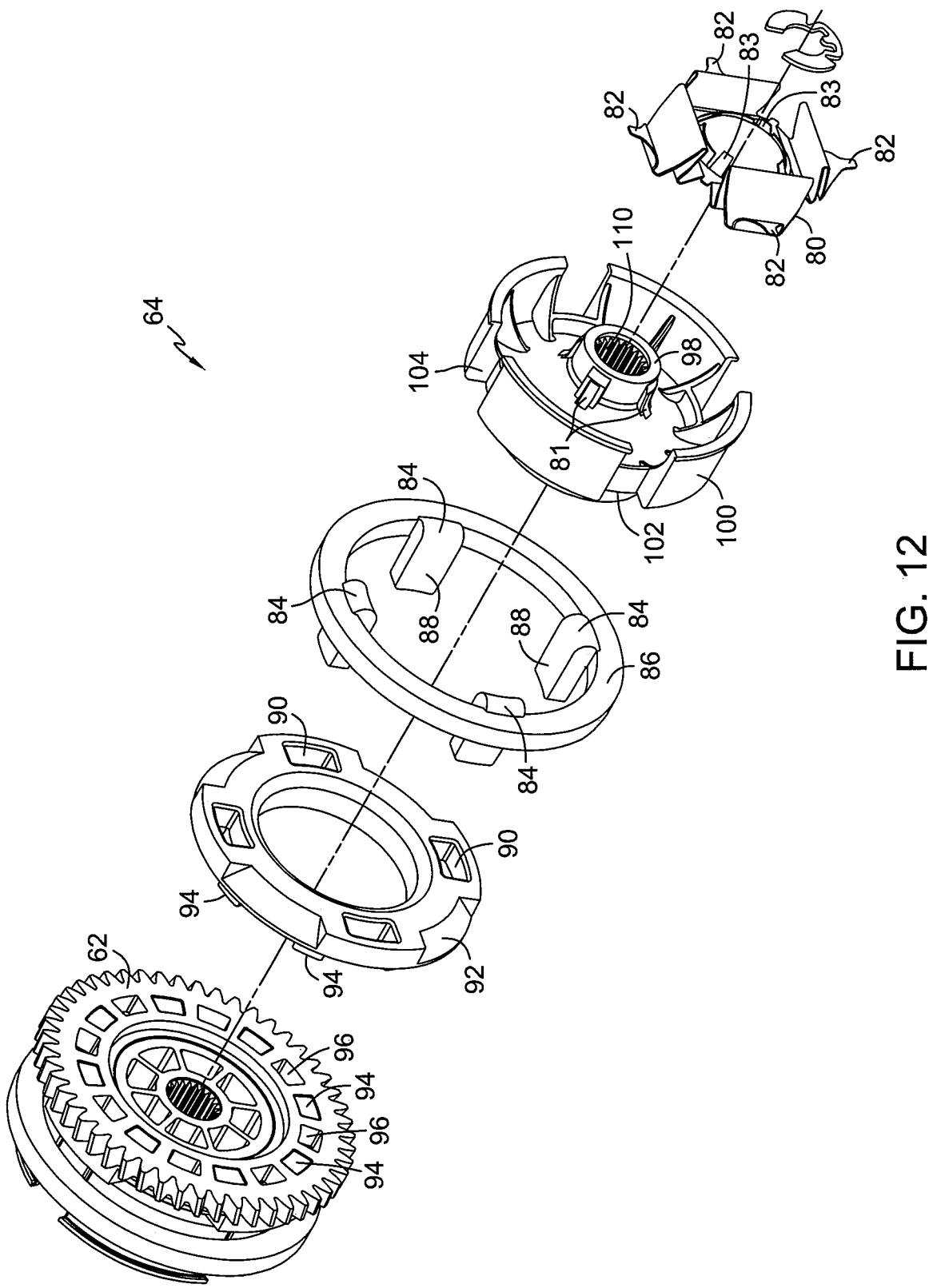
FIG. 12 is an exploded perspective view of a portion of the clutch assembly shown in FIG. 7.
Figure 13:
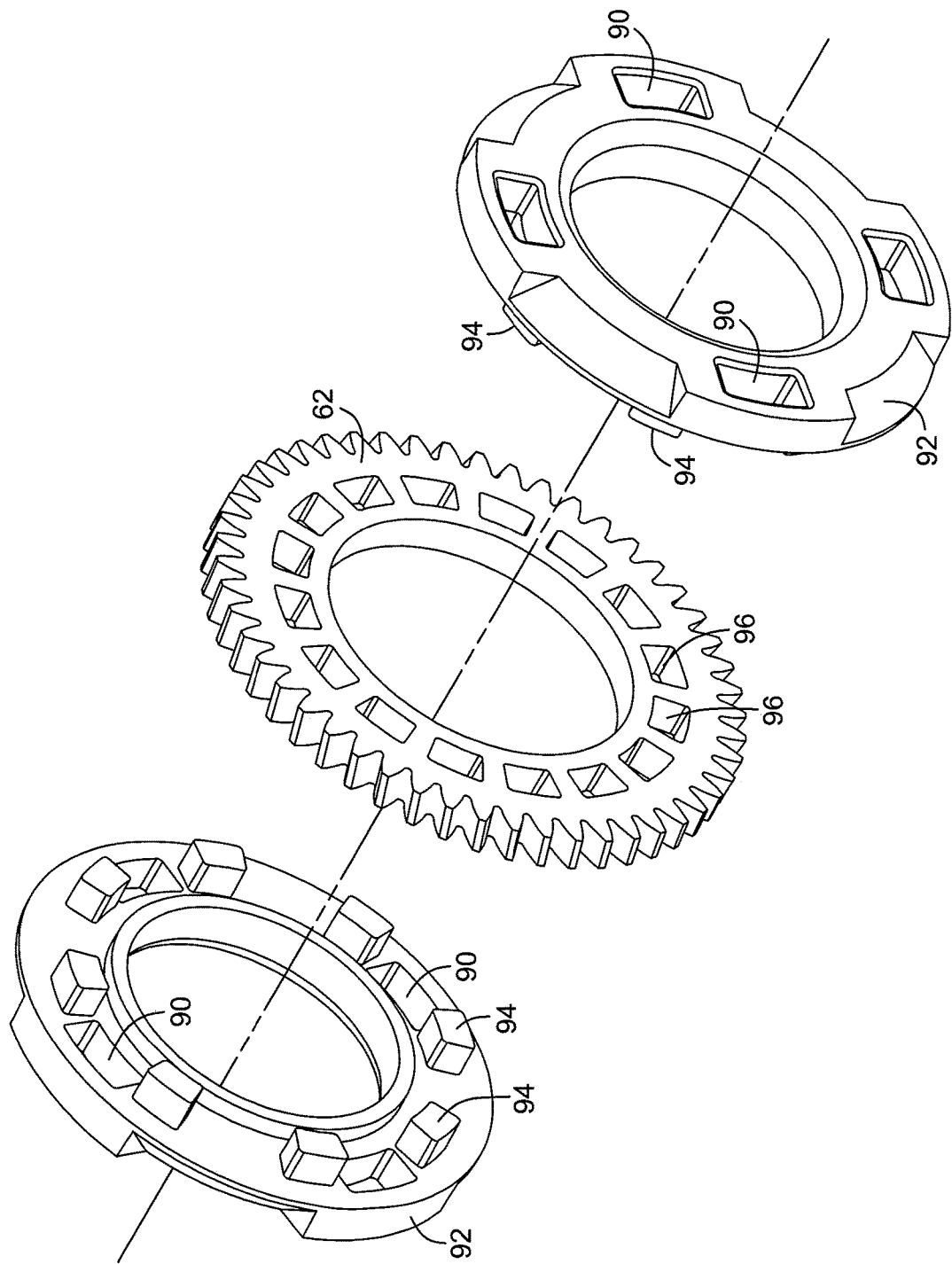
FIG. 13 is a perspective view of certain elements of the clutch assembly shown in FIGS. 7 and 12.

Steering of vehicle 10 is accomplished by use of clutch assemblies 64 and 66 in association with gear 62. Clutch assemblies 64 and 66 are shown in more detail in FIGS. 7-13. In FIG. 7, both clutch assemblies 64 and 66 are in the engaged position, which would cause gear 62 to provide motive power to rotate both shafts 68 and 70. One arm 72 has been removed in FIG. 8 to permit better viewing of the components of clutch assembly 64. The discussion herein is primarily of clutch assembly 64 with the understanding that clutch assembly 66 is identical in configuration.

Clutch assemblies 64 and 66 are configured to be continuously actuated by the force of spring 80, by way of flexible fingers 82. As better seen in FIGS. 8 and 10, tabs 83 of spring 80 engage slots 81 of hub 100. Specifically, as spring 80 is pressed onto hub 100 during assembly, a plurality of tabs 83 flex and subsequently engage slots 81 of hub 100 to mechanically interlock tabs 83 with hub 100 to prevent spring 80 from disengaging from hub 100. Fingers 82 are configured to push against surfaces 84 of ring 86, pushing ring 86 toward interface element 92. Protrusions 88 formed on ring 86 engage openings 90 formed in interface element 92 as ring 86 moves toward interface element 92. Interface element 92 is non-rotatably meshed to gear 62 by engagement of a plurality of protrusions 94 with a corresponding plurality of openings 96 in gear 62. Alternatively, interface element 92 may be formed integral to gear 62.

Interface element 92 is kept in proximity to gear 62 by the interaction of the components adjacent to gear 62. End surface 98 of hub 100 contacts bearing 112 fixed in second housing 54. Interface element 92 engages a step 102 formed in hub 100. Thus, the contact of hub 100 with second housing 54 and with interface element 92 on each side of gear 62 maintains the contact between these elements.

Ring 86 is movable along the axis of axle 68 with respect to interface element 92 and hub 100. Protrusions 88 of ring 86 are located by slots 104 formed in hub 100. When ring 86 is in the engaged position shown in FIGS. 8 and 10, protrusions 88 engage openings 90 formed in interface element 92, thereby transmitting rotational force from gear 62 to axle 68 through clutch assembly 64. Axle shaft 68 is driven by its interface with splines 110 located in hub 100. As fork 106 is pivoted by handle 72, tines 108 of fork 106 move ring 86 axially along slots 104 of hub 100, against the action of spring 80. Ring 86 may be moved in slots 104 such that protrusions 88 will disengage from openings 90 formed in interface element 92, thus disconnecting the rotation of gear 62 and interface element 92, which both continue to rotate as long as motor 40 is operating.

To restore drive to axle shaft 68, handle 72 is returned to its original position, removing the holding force from ring 86. Flexible fingers 82 on spring 80 will then act on surfaces 84 to slide ring 86 toward interface element 92, thus permitting protrusions 88 to reengage openings 90 formed in interface element 92. Since interface element 92 is continuously driven by gear 62, reengagement of protrusions 88 with openings 90 in interface element 92 will cause axle shaft 68 to rotate.

It will be appreciated by those in the art that the width of openings 90 may be larger than the width of protrusions 88. Under certain operating conditions, if the width of openings 90 is not large enough—for example, if the width of openings 90 is equivalent to the width of protrusions 88, then the speed at which interface element 92 is rotating will prevent protrusions 88 from engaging openings 90.

Each clutch assembly 64 and 66 operates in a similar fashion. Thus, clutch 64 operates to engage and disengage gear 62 from axle shaft 68, and clutch 66 operates to engage and disengage gear 62 from axle shaft 70. Such operation permits vehicle 10 to be steered. For example, when clutch 64 is disengaged, axle shaft 68 will cease driving, but axle shaft 70 will continue to drive. Vehicle 10 will begin to steer in one direction depending on the nature of the surface on which vehicle 10 is traveling and how much pulling force an operator applies to a handle 25 on the side of vehicle 10 on which axle shaft 68 is located.

Note that handle 72 interfaces with fork 106 by way of coarse tapered splines 71. The relatively large size of these elements allows distribution of stresses over a large area, permitting plastic to be used for both handle 72 and fork 106 for certain applications.

Figure 14:
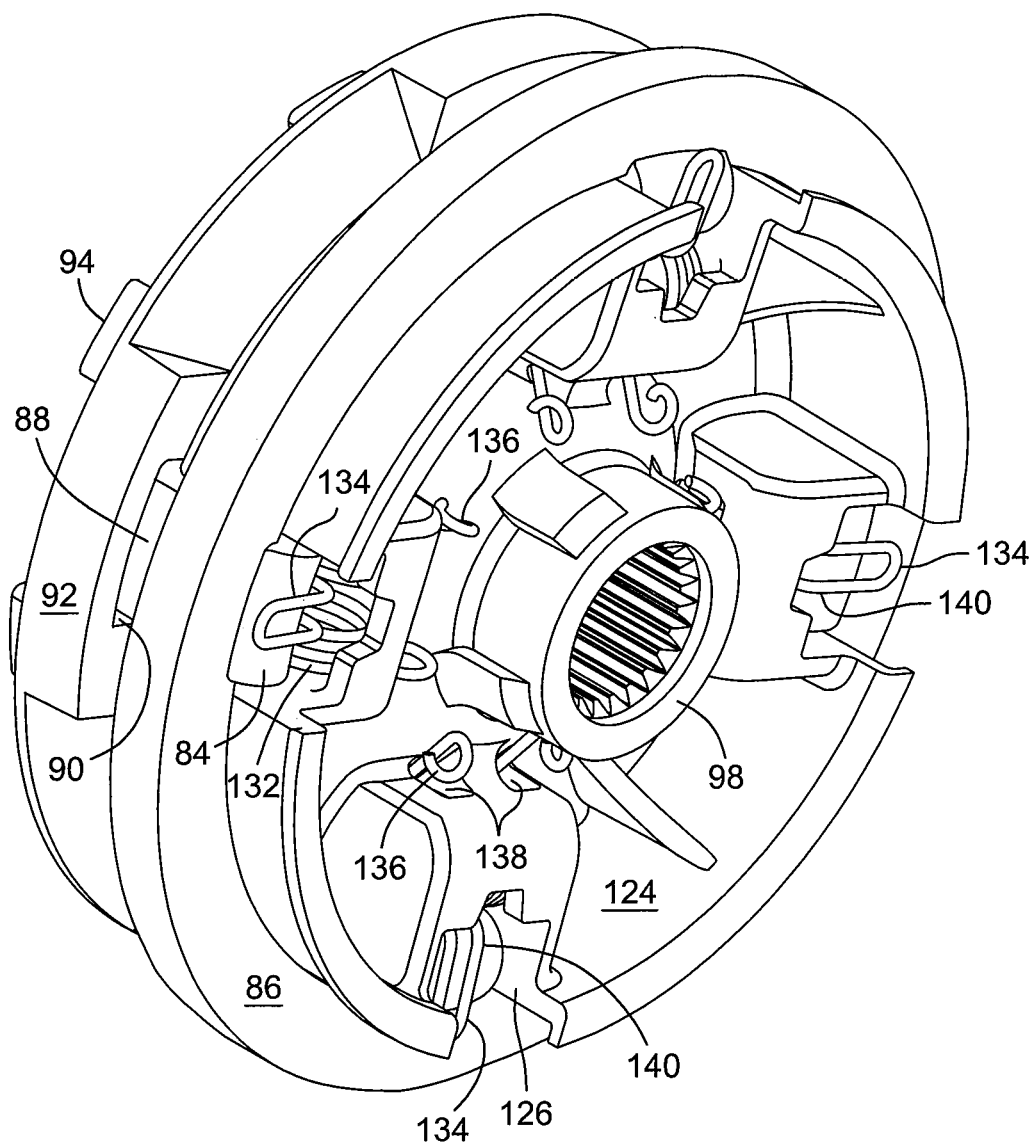
FIG. 14 is a perspective view of a portion of another clutch assembly in accordance with another embodiment of the present invention, with the elements of the clutch assembly in the engaged position.
Figure 15:
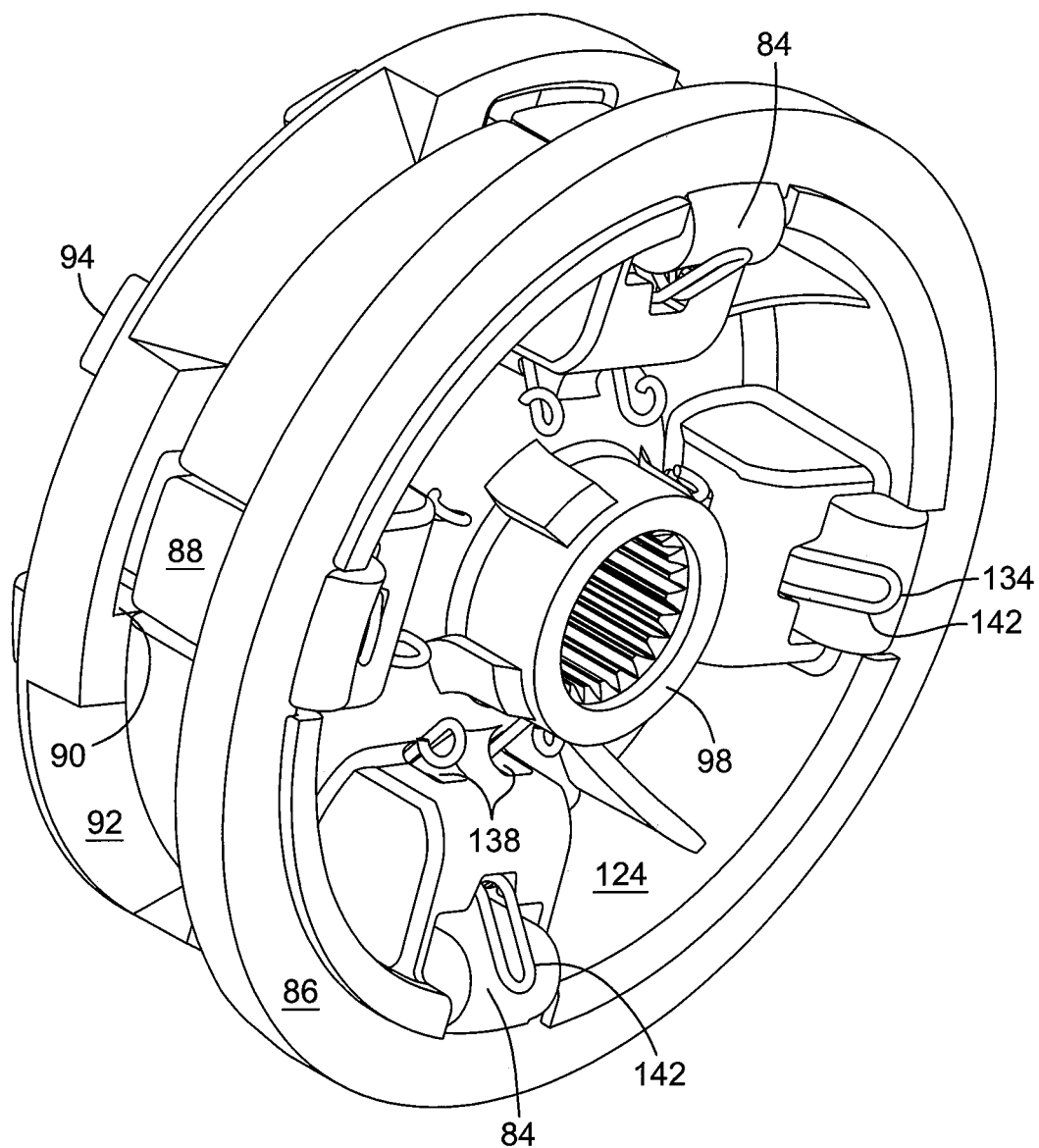
FIG. 15 is a perspective view of a portion of the clutch assembly shown in FIG. 14 with the elements of the clutch assembly in the disengaged position.
Figure 16:
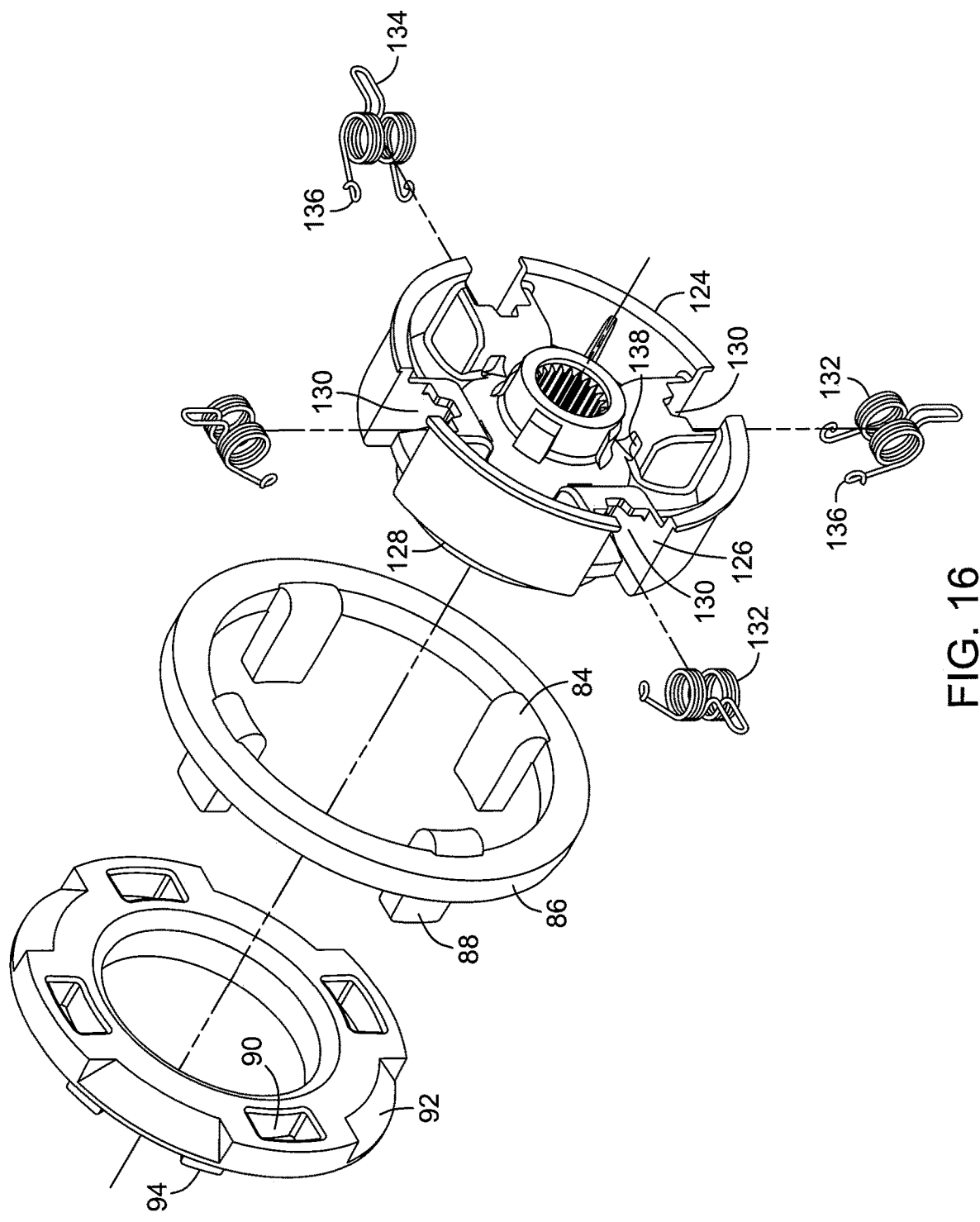
FIG. 16 is an exploded view of certain elements of the clutch assembly shown in FIGS. 14 and 15.
Figure 23:
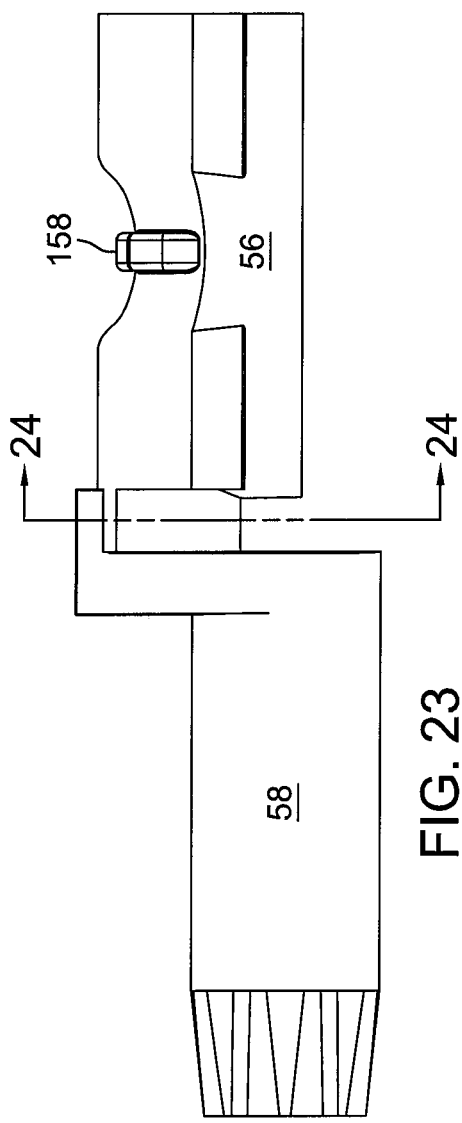
FIG. 23 is a side elevational view of the assembled swash plate mechanism and mating trunnion shown in FIG. 18.

FIGS. 14 to 16 show elements of another clutch embodiment. Interface element 92 and ring 86 may be the same as in the previous clutch embodiment. Hub 124 is similar in many respects to hub 100, having slots 126 that serve the same function as slots 104 of hub 100 and a step 128 that serves the same function as step 102 of hub 100. However, hub 124 also has a plurality of spring chambers 130. Specifically, hub 124 has four spring chambers 130 suitable for mounting springs 132 therein, though the number of springs 132 and associated chambers 130 depends on the force required to move ring 86 into engagement with interface element 92.

Each spring 132 has a first portion 134 that contacts surface 84 of ring 86. When ring 86 is engaged with openings 90 formed in interface element 92, surface 84 contacts first portion 134 of each spring 132 in a first location 140. As shown in FIG. 15, when an operator moves clutch fork 106 to disengage ring 86 from openings 90 formed in interface element 92, the contact location engaged to surface 84 on the first portion 134 of spring 132 slidingly changes to a second location 142 closer to the end of first portion 134. Having surface 84 contact first portion 134 in two locations during movement of the ring 86 to a disengaged position results in increased leverage, such that an operator disengaging either clutch assembly 64 or 66 by actuating lever 24 would perceive a constant grip force requirement throughout the lever's range of motion, whereas the required grip force would increase throughout the lever's range of motion if the contact location on the first portion 134 of spring 132 remained the same as spring 132 is coiled.

Spring 132 also has a second portion 136 that assists in securing spring 132 in spring chamber 130. Second portion 136 extends through opening 138. Second portion 136 may have an end configured to help engage the edges of opening 138 to assist in maintaining engagement of second portion 136 with hub 124.

FIGS. 17-25 show an improved swash plate mechanism 56 whose position is adjusted by trunnion arm 58. As shown in, e.g., FIGS. 1 and 2, as an operator moves speed adjusting lever 26, control arm 59 is similarly adjusted. Control arm 59 is connected to trunnion arm 58 by way of engaging features 156, which may be splines or other known mating features. Thus, movement of control arm 59 causes trunnion arm 58 to similarly move, thus moving swash plate 56 along a track (not shown) formed in first housing 52. Swash plate 56 is guided along this track by one or more protrusions 158 formed approximately at the center of the swash plate 56 along its path of rotation.

Trunnion arm 58 has a portion 148 that interfaces with swash plate 56. Interface portion 148 has arcuate sides 150 that interface with the interior sides 152 of a pocket 154 formed in swash plate 56. Interior sides 152 may be of a similar arcuate shape to that of interface portion 148 or, alternatively, may simply be flat surfaces (not shown). In the embodiment depicted herein, and as shown most clearly in FIG. 22, each interior side 152 consists of an arcuate portion 152a terminating in a flat portion 152b, and arcuate sides 150 of interface portion 148 alternately contact the two flat portions 152b.

Figure 25:
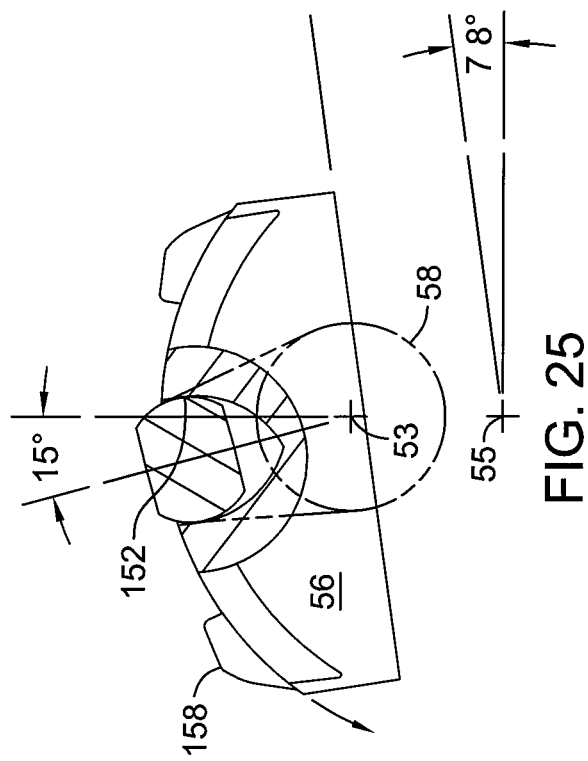
FIG. 25 is the same sectional view as in FIG. 24, with the swash plate in an actuated position.
Figure 24:
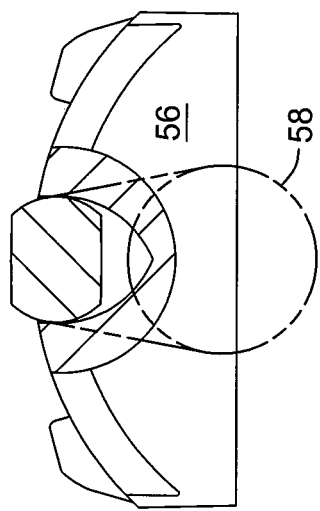
FIG. 24 is a sectional view along the lines 24-24 of FIG. 23, with the swash plate in a neutral position.

Trunnion arm 58 rotates about axis of rotation 53, while swash plate 56 rotates about parallel axis of rotation 55, as seen in, e.g., FIG. 25. Because the two axes of rotation are offset, rotational movement of trunnion arm 58 causes a lesser relative movement of swash plate 56. See, for example, FIG. 25, where a 15 degree movement of trunnion arm 58 generates approximately 7.8 degrees of swash plate 56 movement.

Rotating about two, offset axes of rotation requires relative movement between the arcuate sides 150 formed on interface portion 148 and the interior sides 152 formed in pocket 154. The shape of each arcuate side 150 enables such relative movement, provided that in the case of the interior sides 152 being of a similar arcuate shape, each arcuate side 150 has a smaller radius than the corresponding interior side 152. Thus, interface portion 148 is able to slidably move along the interior sides 152 of pocket 154 while maintaining a minimal clearance therebetween. In the embodiment depicted in FIGS. 21 and 22, one arcuate side 150 of interface portion 148 is able to slidably move along a flat portion 152b of an interior side 152 of pocket 154 while the opposing arcuate side 150 maintains the aforementioned clearance and prevents the occurrence of an interference fit with the opposing interior side 152 of pocket 154. Minimizing clearance between interface portion 148 and interior sides 152 is desirable to minimize hysteresis of the swash plate. Excessive hysteresis may be noticeable by an operator and may be perceived as an undesirable vehicle operating condition. It should be understood however, that some clearance is necessary to permit such slidable movement, wherein one or the other arcuate side 150 of the interface portion 148 is engaged to a flat portion 152b of an interior side 152 of pocket 154 depending upon the direction of rotation applied to trunnion arm 58.

Swash plate 56 may be fabricated of a material such as nylon 6/6, and approximately 30% glass filled, which permits operation directly against first housing 52. In the depicted embodiment, swash plate 56 is fabricated from a 33% glass filled nylon 6/6. Swash plate 56 is constrained by various elements in the housing; constraint in the direction along the axis of the center of rotation of swash plate 56 is provided by protrusions 158. As previously noted, protrusions 158 ride in a groove or track (not shown) formed in the internal surface of housing 52, limiting movement of swash plate 56 in a direction perpendicular to the longitudinal dimension of protrusions 158. Note that while two protrusions 158 are shown, a single protrusion 158 may have sufficient length and strength to maintain the position of swash plate 56 in housing 52. Note also that protrusions 158 may be positioned on either side of an opening 160 formed in swash plate 56 that may permit input shaft 34 to cross from one side of swash plate 56 to a second, opposite side of swash plate 56.

While gear 62, interface element 92, ring 86, hub 100 and hub 124 are manufactured from 30% glass filled nylon 6/6 in the depicted embodiment, other plastics may be used depending on the anticipated internal temperature and stresses that will be exerted on the various components of drive device 16. Also, though plastics are preferred because of cost and weight, these components may be replaced by metal components formed by die casting, powdered metal and other appropriate manufacturing processes.

A drive device such as drive device 16 frequently has an internal reservoir filled with a hydraulic fluid. Typically used hydraulic fluids expand or contract with changes in temperature. To prevent pressure differentials between the interior of drive device 16 and the exterior of drive device 16 that might tend to cause damage to the housings or seals of drive device 16, a vent is typically employed. While such vents are advantageous during operation of drive device 16, during shipping drive device 16 may be oriented such that a hydraulic fluid internal to drive device 16 leaks from a vent, or the movement of fluid during shipping may cause fluid to leak from a vent. Thus, an improved vent design may reduce leakage during shipping.

Figure 26:
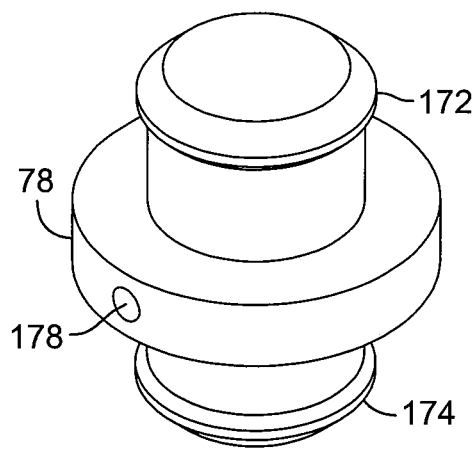
FIG. 26 is a perspective view of a vent in accordance with the principles of the present invention.
Figure 27:
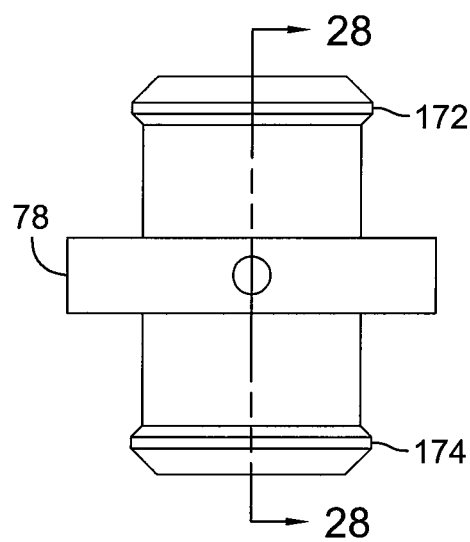
FIG. 27 is a side elevational view of the vent shown in FIG. 26.
Figure 28:
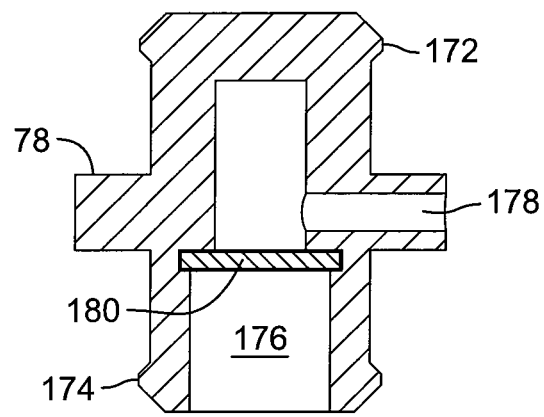
FIG. 28 is a sectional view along the lines 28-28 of FIG. 27.

Vent plug 78, which is preferably of a material that provides a fluid seal, such as rubber, may be seen in more detail in FIGS. 26-28. Vent plug 78 may be installed in different orientations; it comprises a first side 172 that prevents air from entering or exiting drive device 16, and a second side 174 that permits communication between sump 76 and the external environment. First side 172 of vent plug 78 is installed into drive device 16 during shipping, or at other times when leaking of hydraulic fluid is a possibility. Once drive device 16 reaches an original equipment manufacturer or other end user, vent plug 78 is removed from drive device 16 and installed again into drive device 16 with second side 174 inserted into drive device 16. With second side 174 installed in drive device 16, air may be exchanged between the exterior of drive device 16 and internal sump 76 of drive device 16 by way of first passage 176 and second passage 178, with the direction of air movement dependent on whether the hydraulic fluid within drive device 16 is expanding or contracting. An air permeable, water impermeable membrane 180 may optionally be included in vent plug 78 to minimize the introduction of water or water vapor into internal sump 76.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive device for a vehicle, the drive device comprising:
   a variable displacement hydraulic pump;
   a swash plate engaged to the hydraulic pump and comprising a pocket with a first side and a second side generally opposite thereto, the swash plate being moveable between a neutral position and a plurality of actuated positions;

wherein a first portion of the first side of the pocket and a first portion of the second side of the pocket are both arcuate in shape, and a second portion of the first side of the pocket and a second portion of the second side of the pocket are both flat in shape;

a trunnion arm engaged to the swash plate; and an interface portion formed on a first end of the trunnion arm and engaged to the pocket, the interface portion comprising a first interface arcuate side and a second interface arcuate side generally opposite thereto, wherein the first interface arcuate side slidingly engages the first side of the pocket as the trunnion arm is rotated in a first direction, and the second interface arcuate side slidingly engages the second side of the pocket as the trunnion arm is rotated in a second direction opposite the first direction, and one of the first interface arcuate side or the second interface arcuate side is directly engaged to the respective first side or second side of the pocket when the swash plate is in the neutral position.

2. The drive device of claim 1, wherein the first interface arcuate side slidingly engages the second, flat portion of the first side of the pocket as the trunnion arm is rotated in the first direction, and the second interface arcuate side slidingly engages the second, flat portion of the second side of the pocket as the trunnion arm is rotated in the second direction.

3. The drive device of claim 1, wherein the swash plate is rotatable about a first axis of rotation and the trunnion arm is rotatable about a second axis of rotation, wherein the second axis of rotation is offset from the first axis of rotation.

4. The drive device of claim 3, wherein the hydraulic pump and the swash plate are disposed in a housing, the swash plate further comprising at least one guide formed thereon, and the at least one guide engages an inner surface of the housing to prevent axial movement of the swash plate along the first axis of rotation.

5. The drive device of claim 3, further comprising a control arm attached to a second end of the trunnion arm, wherein rotation of the control arm results in an equivalent rotation of the trunnion arm and a lesser rotation of the swash plate.

6. The drive device of claim 5, further comprising:
a housing in which the hydraulic pump and the swash plate are disposed, and the control arm is disposed external to the housing;
a hydraulic motor disposed in the housing and hydraulically connected to the hydraulic pump, wherein the hydraulic pump rotates about a third axis of rotation that is perpendicular to the first and second axes of rotation, and the hydraulic motor rotates about a fourth axis of rotation that is parallel to the third axis of rotation.

7. The drive device of claim 6, further comprising a pump input shaft extending through an opening in the swash plate, and at least one protrusion formed on the swash plate and extending in a direction perpendicular to the first axis of rotation to engage the housing and limit movement of the swash plate in the direction perpendicular to the first axis of rotation.

8. A drive device for a vehicle, the drive device comprising:
a center section disposed in a housing;
a hydraulic pump comprising a first cylinder block having a plurality of axial pistons disposed therein, the first cylinder block being disposed on a first portion of the center section and hydraulically connected to a hydraulic motor comprising a second cylinder block disposed on a second portion of the center section, wherein the hydraulic pump is powered by a pump input shaft extending into the housing;
a motor shaft engaged to and driven by the hydraulic motor, and at least one output axle driven by the motor shaft and extending out of the housing to power the vehicle; and
a trunnion arm extending into the housing and having an interface portion engaged to a swash plate to rotate the swash plate between a neutral position and a plurality of actuated positions, wherein the swash plate is engaged to the plurality of axial pistons of the hydraulic pump and comprises a pocket on one side thereof to receive the interface portion of the trunnion arm, the pocket having a first internal pocket side and a second internal pocket side, and the interface portion comprises:
a first interface side and a second interface side opposite the first interface side;
a third interface side extending between the first interface side and the second interface side; and
a fourth interface side, opposite the third interface side, and extending between the first interface side and the second interface side;
wherein (i) the first interface side and the second interface side are both arcuate in shape, through their entire lengths between the third interface side and the fourth interface side, (ii) the first interface side slidingly engages the first internal pocket side and the fourth interface side slidingly engages the second internal pocket side during rotation of the swash plate; and (iii) one of the first interface side or the second interface side directly contacts its respective first internal pocket side or second internal pocket side when the swash plate is in the neutral position.

9. The drive device of claim 8, wherein the swash plate is rotatable about a first axis of rotation and the trunnion arm is rotatable about a second axis of rotation parallel to and offset from the first axis of rotation.

10. The drive device of claim 9, further comprising a control arm engaged to the trunnion arm, wherein rotation of the control arm results in an equivalent rotation of the trunnion arm and a lesser rotation of the swash plate.

11. The drive device of claim 9, wherein the hydraulic pump rotates about a third axis of rotation that is perpendicular to the first and second axes of rotation, and the hydraulic motor rotates about a fourth axis of rotation that is parallel to the third axis of rotation.

12. The drive device of claim 11, further comprising a pair of axles extending from the housing and driven by a gear mechanism powered by the motor shaft.

13. The drive device of claim 8, wherein at least a portion of the first internal pocket side and at least a portion of the second internal pocket side are arcuate in shape.

14. The drive device of claim 13, wherein a second portion of the first internal pocket side and a second portion of the second internal pocket side are both flat in shape.

15. A drive device for a vehicle, the drive device comprising:
a variable displacement hydraulic pump;
a swash plate engaged to the hydraulic pump and comprising a pocket with a first side and a second side generally opposite thereto, the swash plate being rotatable about a first axis of rotation between a neutral position and a plurality of actuated positions;

a trunnion arm engaged to the swash plate and rotatable about a second axis of rotation, wherein the second axis of rotation is offset from the first axis of rotation;

an interface portion formed on a first end of the trunnion arm and engaged to the pocket, the interface portion comprising a first interface arcuate side and a second interface arcuate side generally opposite thereto, wherein the first interface arcuate side slidingly engages the first side of the pocket as the trunnion arm is rotated in a first direction, and the second interface arcuate side slidingly engages the second side of the pocket as the trunnion arm is rotated in a second direction opposite the first direction, and one of the first interface arcuate side or the second interface arcuate side is directly engaged to the respective first side or second side of the pocket when the swash plate is in the neutral position; and a control arm attached to a second end of the trunnion arm, wherein rotation of the control arm results in an equivalent rotation of the trunnion arm and a lesser rotation of the swash plate.

16. The drive device of claim 15, further comprising:

a housing in which the hydraulic pump and the swash plate are disposed, and the control arm is disposed external to the housing;

a hydraulic motor disposed in the housing and hydraulically connected to the hydraulic pump, wherein the hydraulic pump rotates about a third axis of rotation that is perpendicular to the first and second axes of rotation, and the hydraulic motor rotates about a fourth axis of rotation that is parallel to the third axis of rotation.

17. The drive device of claim 16, further comprising a pump input shaft extending through an opening in the swash plate, and at least one protrusion formed on the swash plate and extending in a direction perpendicular to the first axis of rotation to engage the housing and limit movement of the swash plate in the direction perpendicular to the first axis of rotation.

* * * * *